(12) United States Patent
Wurzer

(10) Patent No.: US 9,336,309 B2
(45) Date of Patent: May 10, 2016

(54) DETECTING CORRELATIONS BETWEEN DATA REPRESENTING INFORMATION

(75) Inventor: Joerg Wurzer, Remscheid (DE)

(73) Assignee: IQSER IP AG, Basserdorf (CH)

(*) Notice: Subject to any disclaimer, the term of this patent is extended or adjusted under 35 U.S.C. 154(b) by 181 days.

(21) Appl. No.: 12/716,626

(22) Filed: Mar. 3, 2010

(65) Prior Publication Data

US 2010/0223247 A1   Sep. 2, 2010

Related U.S. Application Data

(63) Continuation of application No. PCT/EP2008/003786, filed on May 9, 2008.

(30) Foreign Application Priority Data

Sep. 3, 2007  (EP) .................. PCT/EP2007/007664

(51) Int. Cl.
   *G06F 17/30*  (2006.01)

(52) U.S. Cl.
   CPC .... *G06F 17/30864* (2013.01); *G06F 17/30731* (2013.01); *G06F 17/30997* (2013.01)

(58) Field of Classification Search
   CPC .................. G06F 17/30911; G06F 17/30731; G06F 17/30864; G06F 17/30997
   See application file for complete search history.

(56) References Cited

U.S. PATENT DOCUMENTS

| | | | | |
|---|---|---|---|---|
| 6,748,377 | B1* | 6/2004 | Attaluri | 707/999.004 |
| 2004/0010483 | A1* | 1/2004 | Brands et al. | 706/45 |
| 2005/0125400 | A1* | 6/2005 | Mori et al. | 707/4 |
| 2006/0047649 | A1* | 3/2006 | Liang | 707/4 |
| 2006/0080296 | A1* | 4/2006 | Morikawa et al. | 707/3 |
| 2007/0282814 | A1* | 12/2007 | Gupta | 707/3 |

FOREIGN PATENT DOCUMENTS

| | | | |
|---|---|---|---|
| WO | 2005050471 A2 | | 6/2005 |
| WO | WO2005050471 | * | 6/2005 |
| WO | 2007095997 A1 | | 8/2007 |

OTHER PUBLICATIONS

International Search Report; PCT/EP2008/003786; Jun. 30, 2008; 3 pages.

* cited by examiner

*Primary Examiner* — Dinku Gebresenbet
(74) *Attorney, Agent, or Firm* — Grossman, Tucker, Perreault & Pfleger, PLLC

(57) ABSTRACT

The present invention relates to a method for acquiring at least one interrelation between at least one item of data representing at least one item of information of at least one data inventory and at least one item of data representing at least one item of information of a request for an interrelation (interrelation request) to the at least one item of data representing at least one item of information of at least one data inventory by means of a data processing system. Furthermore, a data processing system with data representing information in at least one data inventory that is accessible via at least one data source as well as a data processing device for electronic data processing comprising a control and/or computing unit, an input unit and an output unit, which are respectively configured and/or adapted for at least partially carrying out a method according to the invention are also contemplated.

6 Claims, 33 Drawing Sheets

A :

| IQser |
| (from com.iqser) |
|---|
| -logger:Logger=Logger.getLoggen("IQser") |
| -singleton : IQser = null |
| -IQser() |
| +getInstance():IQser |
| +getContentLinks(in prio:double) |
| +getContentList |
| +getContentList |
| +isContendMarked():boolean |
| +getContentView() |
| +getSettings() |
| +getInstalledProvider():Hashtable |
| +createLink() |
| +createContent(in key:String) |
| +markContent(in b:bolean) |
| +performAction() |
| +removeAction() |
| +removeLink() |
| -init() |

```
PluginManager
(from com.iqser.kernel.plugin)
```
-logger:Logger=Logger.getLoggen(PluginManager.class)

-pluginList:Hashtable=null

+PluginManager()
+getContentProvider(in type:String):ContentProvider
+getContentProviderKeys():Enumeration
+reInit()
-isPlugin(in packagename:String):boolean
-init()
-initPlugins()
-readPluginDir():List
-registerPlugin(in packagename:String)

```
InvalidSettingsExeption
from com.iqser.kernel.plugin
```

+InvalidSettingsExeption()
+InvalidSettingsExeption(in message:String)

| Plugin |
| --- |
| (from com.iqser.kernel.plugin) |
| -logger:Logger=Logger.getLogger(Plugin.class)<br>+contentProvider:ContentProvider=null<br>+crawler:Crawler=null<br>-classloader:URLClassLoader=null<br>-libonly:boolean=false<br>-pluginPath:String=null |
| +Plugin(in pluginPath:String)<br>+getClasspath():List<br>+setContentProvider(in contentProvider:ContentProvider)<br>+getContentProvider():ContentProvider<br>+setCrawler(in crawler:Crawler)<br>+getCrawler():Crawler<br>+SetLibonly(in libonly:boolean)<br>+isLibonly():boolean<br>+setSettings()<br>+getSettings()<br>+addClasspath(in libs:List)<br>+init()<br>+startThreads()<br>-loadCrawlerInstance()<br>-loadProviderInstance()<br>-readSettings()<br>+getId():String<br>+setId(in id:String)<br>+getPluginPath():String<br>+setPluginPath(in pluginPath:String) |

Fig. 5d

| PluginSettings |
|---|
| -requires:List |
| -runtime:List |
| -initParams:Properties |
| -classname:String |
| -crawlerclass:String |
| -id:String |
| -iqserPath:String |
| -name:String |
| -pluginPath:string |
| -vendor:String |
| -type:String |
| -version:String |
| -crawlerdelay:long |
| +PluginSettings() |
| +setClassname(in classname:String) |
| +getClassname():String |
| +setCrawlerclass(in crawlerclass:String) |
| +getCrawlerclass():String |
| +setCrawlerdelay(in crawlerdelay:String) |
| +getCrawlerdelay():long |
| +setId(in id:String) |
| +getId():String |
| +getInitParams():Properties |
| +setIqserPath(in iqserPath:String) |
| +getIqserPath():String |
| +setName(in name:String) |
| +getName():String |
| +setPluginPath(in PluginPath:String) |
| -updateClasspath() |
| +getPluginPath():String |
| +setVendor(in providername:String) |
| +getVendor():String |
| +getRequires():List |
| +getRuntime():List |
| +getRuntimeURL():URL |
| +setType(in type:String) |
| +getType():String |
| +setVersion(in version:String) |
| +getVersion():String |
| +addInitParam(in name:String, in value:String) |
| +addRequires(in plugin:String) |
| +addRuntime(in archive:String) |

| Crawler |
| from com.iqser.kernel.crawler |
| -logger:Logger=Logger.getLoggen (crawler.class.getName) <br> -repository:Repository=null <br> -delay:long=0 |
| +Crawler(in delay:long) <br> +run() |

| <<interface>> <br> Repository <br> (from com.iqser.repository) |
| --- |
| +getContentByKey(in id:long) <br> +getContentByProvider(in provider:String):Collection <br> +getContentByUrl(in url:String, in provider:String) <br> +getRelatedContent(in id:long, in maxPriority:double):Collection <br> +searchContent(in filter:Filter):Collection <br> +updateContent() <br> +addContent():long <br> +addLink(in id1:long, in id2:long, in prio:double) <br> +deleteContent() <br> +updateLink(in id1:long, in id2:long, in prio:double) <br> +isLinked(in id1:long, in id2:long):boolean <br> +setSettings() |

PluginManager
---
-logger:Logger=Logger.getLoggen(PluginManager.class)
-pluginList:Hashtable=null
---
+PluginManger()
+getContentProvider(in type:String):ContentProvider
+getContentProviderKeys():Enumeration
+reInit()
-isPlugin(in packagename:String):Boolean
-init()
-initPlugins()
-readPluginDir():List
-registerPlugin(in Packagename:String)

ContentProvider
---
-logger:Logger=Logger.getLoggen(ContentProvider.class)
---
+getContentList():ContentList
+getContentList(in c:Collection, in 1:Filter):ContentList
+getContentName():String
+getContentType():String
+getView(in c:Content)
+version():String
+setSettings()
+getSettings()
+createContent(in c:Content):Content
getLoggen(in cls:Class):Logger
isContentMatched(in filter:Filter, in attributeList:AttributeList):boolean

| RepositorySettings |
|---|
| -runtime:List<br>-className:String<br>-jdbcDriver:String<br>-jdbcPassword:String<br>-jdbcUrl:String<br>-jdbcUser:String<br>-name:String<br>-providerName:String<br>-repositoryId:String<br>-type:String<br>-veriosn:String |
| +RepositorySettings()<br>+setClassName(in className:String)<br>+getClassName():String<br>+setJdbcDriver(in jdbcDriver:String)<br>+getJdbcDriver():String<br>+setJdbcPassword(in jdbcPassword:String)<br>+getJdbcPassword():String<br>+setJdbcUrl(in jdbcUrl:String)<br>+getJdbcUrl():String<br>+setJdbcUser(in jdbcUser:String)<br>+getJdbcUser():String<br>+setName(in Name:String)<br>+getName():String<br>+setProviderName(in providerName:String)<br>+getProviderName():String<br>+setRepository(in repositoryId:String)<br>+getRepository():String<br>+getRuntime():List<br>+getRuntimeUrl():URL<br>+setType(in type:String)<br>+getType():String<br>+setVersion(in version:String)<br>+getVersion():String<br>+addRuntime(in archive:String) |

| DefaultRepository |
|---|
| -logger:Logger=Logger(DefaultRepository.class) |
| -connection:Connection<br>-isConnected:boolean=false |
| +getContentByKey(in id:long)<br>+getContentByUrl(in url:String, in provider:String)<br>+getContentByProvider(in provider:String):Collection<br>+getRelatedContent(in id:lonf, in maxPriority:double):Collection<br>+getTrackerItems():LinkedList<br>+addContent():long<br>+addLink(in id1:long, in id2:long, in prio:double)<br>+addTrackerItem(in item:TrackerItem)<br>-connect()<br>+deleteContent()<br>+deleteFirstTrackerItem()<br>+deleteLastTrackerItem()<br>-disConnect()<br>+searchContent(in filter:Filter):Collection<br>+updateContent()<br>+updateLike(in id1:long, in id2:long, in prio:double)<br>-getNextId():long<br>-createTableContent()<br>-createTableRelations()<br>-createTableTracker()<br>+isLinked(in id1:long, in id2:long):boolean<br>-init()<br>-loadJdbc(Driver)<br>+setSettings() |

Fig. 10c

DETECTING CORRELATIONS BETWEEN DATA REPRESENTING INFORMATION

CROSS-REFERENCE TO RELATED APPLICATIONS

The present application is a continuation of pending International patent application PCT/EP2008/003786 filed on May 9, 2008, which designates the United States and claims priority from pending International patent application PCT/EP2007/007664 filed on Sep. 3, 2007. The content of all prior applications is incorporated herein by reference.

FIELD OF THE INVENTION

The present invention relates to a method for acquiring at least one interrelation between at least one item of data representing at least one item of information of at least one data inventory and at least one item of data representing at least one item of information of a request for an interrelation (interrelation request) to the at least one item of data representing at least one item of information of at least one data inventory by means of a data processing system with data representing information in at least one data inventory which can be accessed via at least one data source, wherein the at least one interrelation itself will be acquired as an item of data representing at least one item of information in a data inventory and dynamically as a link between at least one item of data representing at least one item of information of at least one data inventory and at least one other item of data representing at least one item of information of at least one data inventory and/or at least one electronic use of at least one item of data representing at least one item of information of at least one data inventory and will be reproduced by means of an optical and/or acoustical display device of the data processing system, wherein the link will be established by means of at least one syntactic comparison and/or by means of one semantic comparison of the at least one item of data representing at least one item of information of at least one data inventory with the at least one item of data representing at least one item of information of the request for interrelation (interrelation request) with/to the at least one item of data representing at least one item of information of at least one data inventory.

Furthermore, the present invention relates to a data processing system with data representing information in at least one data inventory accessible via at least one data source, which system is designed and/or adapted for at least partially carrying out a method according to the invention.

Furthermore, it is an object of the present invention to provide a data processing device for electronic data processing comprising a control and/or computing unit, an input unit and an output unit, which is configured and/or adapted for at least partially carrying out a method according to the invention, preferably using at least a part of a data processing system according to the invention.

BACKGROUND OF THE INVENTION

Numerous embodiments of methods, systems and devices for electronic data processing are known from the state of the art, in particular from WO 2005/050471 A2, the disclosures of which are hereby explicitly referenced.

Methods, data processing systems and/or data processing devices of the kind mentioned in the beginning are used within the scope of search applications or routines for instance by operating systems and/or by so-called search engines, as well as within the scope of organisation, provision and/or delivery of information.

Usually contents are machine-processed as data representing information of a data inventory, in particular in order to be placed at the disposal of users, or to serve users, as technical means for solving tasks. Data inventories in the sense of the invention are simple, universally usable, persistent data objects containing, like files and/or documents in operating systems or databases, in particular structural, content, and administrative information, as required.

In data processing systems and/or data processing devices the data inventories are usually accessible to a data processing system and/or a data processing device via at least one data source, usually a data carrier available within a data processing system or interfaceable or connectible via a communication network, for instance a hard disc or similar data recording means.

Operating systems operate with a hierarchical order of files, for instance in their so-called file system. Herein, the files are arranged as a data inventory in directories in a tree structure. Navigation in the files usually occurs along an Aristotelic logic via the names of the individual directories down to a file. Herein, the process of navigation can comprise several steps and furthermore involves the problem of an unambiguous assignment. Moreover, in operating systems, the administration of files is separated from the administration of data which are exclusively accessible via application programs accessing databases or file-based data structures, as for instance XML. Normally, the separation occurs in accordance with the technical implementation or realisation of the persistence of the respective data.

In database-supported applications, relational databases managing static connections of tables provided with data have been used hitherto. Due to the used static connections in the tables managed by search engines, modifications in the data inventories cannot be acquired at all or only in a limited manner and with a delay. The evaluation or use of the data must be determined in a foresighted manner.

Usually, search engines allow users to search data inventories only for keywords or a Boolean combination of keywords. Precise search requests, as for instance the calling of invoices or the like from a particular period of time or similar queries are not possible.

Moreover, data processing systems usually operate with a static—i. e. firmly preset—hierarchically structured menu structure providing the user with a selection of possible functions for operating the data processing system. In operating systems such as for instance MacOS X of the company Apple, so-called pop-up menus are used in addition. These are also hierarchically structured menu structures which, depending on the installed application programs, however, can be supplemented at least partly by corresponding menu items for starting or calling individual application programs and/or functionalities of the same. Apart from the supplementability of the menu structures, the latter are nevertheless statically hierarchically structured in their use. The previously existing static hierarchical structuring of menu structures in data processing systems can consequently not, or only to a limited extent, fulfil a user's preferences of use. Taking the respective context of use into account by means of the menu structures, wherein in particular those menu items are offered in a menu which make sense or are reasonable in the context of the situation or of the called contents, is not possible, in particular not due to the static hierarchical structure of the menus.

Synchronisation of data representing information in data inventories between different data processing devices jointly using the data inventories—in particular in view of the increasing dissemination of data processing devices for mobile use such as so-called PDAs (PDA: Personal Digital Assistant)—is an important part of data processing systems and is integrated into data processing systems for instance in the form of so-called PIM systems (PIM: Personal Information Management). The functionality of synchronisation, however, has previously been restricted to a purely manual selection of information to be synchronised. For instance, a user can only select by manual input which, or which part of, the contact addresses managed by the data processing system he wants to synchronise. A closer or more detailed specification with regard to a limitation of content of the information to be synchronised is not possible, in particular not as an automated process which independently adjusts to the user's requirements.

SUMMARY OF THE INVENTION

In view of this state of the art, it is the object of the present invention to improve the acquisition of interrelations between data representing information avoiding the described disadvantages, in particular with regard to method, scope and handling of the acquisition of interrelations as well as the use of the acquired interrelations, in particular in consideration of the respective user-individual uses of the interrelations.

For the technical solution the present invention proposes a method for acquiring at least one interrelation between at least one item of data representing at least one item of information of at least one data inventory and at least one item of data representing at least one item of information of a request for an interrelation (interrelation request) to the at least one item of data representing at least one item of information of at least one data inventory by means of a data processing system with data representing information in at least one data inventory which can be accessed via at least one data source, wherein the at least one interrelation itself will be acquired as an item of data representing at least one item of information in a data inventory and dynamically as a link between at least one item of data representing at least one item of information of at least one data inventory and at least one other item of data representing at least one item of information of at least one data inventory and/or at least one electronic use of at least one item of data representing at least one item of information of at least one data inventory and will be reproduced by means of an optical and/or acoustical display device of the data processing system, wherein the link will be established by means of at least one syntactic comparison and/or by means of one semantic comparison of the at least one item of data representing at least one item of information of at least one data inventory with the at least one item of data representing at least one item of information of the request for interrelation (interrelation request) with/to the at least one item of data representing at least one item of information of at least one data inventory, wherein within the scope of a request for an interrelation (interrelation request) between the data representing at least one item of information of a request for an interrelation (interrelation request) a set of statements in the sense of subject-predicate-object relations is automatically generated, such that requests for an interrelation (interrelation requests) can be realised in natural language. According to the invention, an interrelation request with an implicit ontology (ontological interrelation request) can be realised herein.

The solution according to the invention advantageously enables to submit data representing information—in the following also referred to as information objects and/or concepts—of the available data inventories, preferably any structured and/or non structured data from data inventories that are accessible via data sources, to an automatic semantic analysis. Herein, a graph is formed as result, which graph consists of multiple links of the information objects. Nodes and edges of this graph can be interpreted as statements in the form of subject-predicate-object. These statements can advantageously be submitted to complex questions and can advantageously deliver concrete answers in form of information objects. Herein, the method according to the invention advantageously requires no manual implementation of statements or ontologies in semantic languages, such as for instance RDF or OWL. The information objects (concepts) are advantageously obtained from both non structured and structured data. Herein, a framework advantageously converts information into a generic object model without information having to be migrated into a central database.

In this manner, the method according to the invention advantageously offers an alternative for creating data resources on the base of RDF or OWL. Both describing languages have great advantages, because very precise statements can be formulated by means of them, which statements can be evaluated by a system for instance by means of the query language SPARQL. The challenge in particular for the so called semantic web however is that many internet pages and/or services first have to be enriched with the semantic data which are implemented with the above mentioned languages. For many operators of large or small internet pages this requires a conversion or enhancement of their content system or their service. Additionally, authors first have to create the semantic enhancement of the offered information. Small semantic enhancements in form of tags are presently already part of the habits of authors of the so called web 2.0, but statements have to be created via special authoring software, for example by an ontology editor.

In contrast to this, the solution according to the invention permits to extract items of content from a structured or non structured data base in such a way that a set of statements is created, which statements can be queried and from which conclusions can be drawn in an automated manner. Thus, the solution according to the invention is suitable to increase the acceptance of semantic technologies and advantageously exhaust the data base existent in the internet. Thereby, the internet becomes a great database according to the invention, which database can be queried in the sense of the vision of the semantic web.

According to the invention, statements are advantageously queried on the base of created sets of statements in the sense of subject-predicate-object relations. Herein, within the scope of the query the set of statements in the sense of subject-predicate-object relations will be advantageously divided into single statements in the form of subject-predicate-object, wherein an item of data representing at least one item of information (information object) represents the subject which is linked via a predicate to another item of data representing at least one item of information (information object) which represents the object of the statement, and wherein the predicate is the reason for the link. Another embodiment of the invention provides that within the scope of the query, the subject and the object of at least one statement of the set of statements in the sense of subject-predicate-object relations are retrieved by means of a combination of a request to the index of the database and a request to the database containing links as results of the interrelation requests and are then afterwards filtered over the links representing the predicate as results of the interrelation requests. According to another proposal of the invention, a query is brought into a form which divides the entire query into partial queries, on the base of the partial queries a query of associated statements of the sets of statements in the sense of subject-predicate-object relations is realised and the results of these partial queries are used for the selection of associated statements of the set of statements in the sense of subject-predicate-object relations. The statements of the set of statements in the sense of subject-predicate-object relations in partial statements are advantageously divided, selected in the database and afterwards combined/linked. In the case where two or more partial statements are connected to one object, either a cut-set is advantageously formed, preferably by an AND-function between the subjects of the partial statements, or a join of sets is formed, preferably by a logical addition of the subjects of the partial statements, and the quantity/set of results representing the subjects of the link will then be used for the next step of request.

Another advantageous embodiment of the invention provides a selection of statements of the set of statements in the sense of subject-predicate-object relations comprising the following process steps:

1. Division of a statement of the set of statements in the sense of subject-predicate-object relations into subject, predicate and object;
2. Request to the index of the database with the subject of the divided statement (description of the subject) which delivers a set of results for the subject (subject set) as result;
3. Request to the index of the database with the object of the divided statement (description of the object) which delivers a set of results for the object (object set) as result;
4. Selection of the database containing links as results of the interrelation requests, in which links a subject from the subject set and an object from the object set are connected to each other via a definite or indefinite predicate.

As result, the selection according to the invention then delivers selected statements.

The automatic analysis of data enabled by the method according to the invention advantageously comprises different aspects, the details, characteristics and advantages of which will be explained in detail in the following:

1. Data Integration Instead of Migration

The method according to the invention for the automatic semantic analysis and evaluation of data representing information at first presumes that this information is obtained from various sources. For this, a special framework, in the present invention the so called Uniform Information Layer is advantageously used. Thanks to this framework, in the present invention data from any source are translated into a generic object which can be processed by the total system (data processing system). Herein, the data are not migrated into a database, but only indexed and analysed.

In the present invention, a database advantageously only retains the respective finding place of the item of information with an unequivocal URI. This URI can be for instance a URL in the case of an internet page or an ID within a database. In the translation according to the invention by the framework, information objects are created which comprise, apart from meta-information that is required by the system, an arbitrary number of attributes. The attributes can be in turn divided into types, names and value. Thanks to the meta-information the system inter alia knows which type a content has, for instance a profile of a person, a Word document or a product description. There is no redundant memorization of data, but only a slim index and a database containing the graph of the information objects. This graph is advantageously obtained by the methods described in the following with respect to item 2.

2. Triple Semantic Analysis of the Information Objects and Multi-Relations

The analyzing process is controlled by a protocol which contains each modification of the data inventory but also all interactions of the user and the system. As soon as there is an entry in this protocol, it will be processed. Herein, the analyses or relations described in the following are advantageously used:

2.1 Syntactic Analysis

The syntactic analysis leads to a link of information objects on the base of key attributes. Key attributes are of special importance for an interrelation or a structuring of a data inventory. For instance, in the case of an e-mail this can be the sender and the addressee, in a document this can be for instance the author and the title and for a product this can be for instance the order number.

If the solution according to the invention is used, for instance the complete correspondence is automatically allocated to a person or all documents are allocated to a project, which refer to it.

The key attributes are advantageously determined in plug-ins to the framework, the Uniform Information Layer. A plug-in has the function to integrate a certain data type and to translate the contained information into a generic information object that can be processed by the system. A data type can be for instance Microsoft Word, Profile from a Community or e-mails from an IMAP server.

2.2 Pattern Analysis

In the pattern analysis according to the invention, information objects are advantageously checked with respect to similarity and connected to each other with a similarity value. Identical information objects get a similarity value which is hardly beneath 1.0. The link value 1.0 is reserved for manual links which are also provided by the system. If totally different information objects are concerned, this link will get the value 0.0. However, this value is only theoretical, because if there is no similarity between two information objects, no link will be created. Thus, the similarity value which can be interpreted as a weighting of the link is in practice comprised between 0.0 and 1.0.

For retrieving the similar information objects, at first the terms are advantageously extracted from an information object and arranged according to reverse frequency. The terms with the lowest frequency have the highest significance for the information object. Frequently used words are usually general terms and do not contribute to the meaning of an information object. A data request is created from a quantity of the most significant words, which data request retrieves the similar information objects of the available data pool. For this, the index concerning all information objects is advantageously used.

2.3 Semantic Analysis

The semantic analysis realised according to the invention is based upon the knowledge from the language philosophy that the meaning of language is not theoretically created, but determined by using it. Meanings can change by the dialogue. Language is living. By analogy, the meaning of information objects is created by using them. It changes with the time and changes the context of its use or the relevance until its insignificance in an out-dated document.

For this reason, the solution according to the invention advantageously protocols all events. This starts with the creation, the change and comes to an end with the deletion of an information object. But also the pure calling of an information object for reading will be advantageously logged. Thereby, the solution according to the invention deduces whether two information objects have been called or processed in a connection. If a sequence of information objects is repeated in the protocol, the solution according to the invention presumes that there is an interrelation of meaning. This interrelation will be strengthened with each return of the pattern. This can go so far that thereby other links recede into the background and become unimportant. An algorithm advantageously calculates the weighting of the links to an object newly in all cases. Thus, a dynamic relation network of information objects is created which adapts to the real use of a user community or an individual user. The latter advantageously realises a personalisation of a semantic network.

2.4 Multi-Relations

It happens that two information objects are linked to each other due to two or even all above mentioned methods (cf. Item 2.1, 2.2 and 2.3). The manual link is advantageously provided as fourth option. It can even happen that there are several reasons why two information objects are linked to each other via the syntactic analysis, for instance via the name and the company of a contact data record. Therefore, there is not only one link between two information objects, but advantageously n links. The weighting of the link which is advantageously displayed as only one is calculated from an average value of the individual weightings. Optionally, it can be advantageously shown to the user of the solution according to the invention why a link has been created. Thereby, the semantic network according to the invention can be advantageously always duplicated.

3. Evaluation of the Semantic Relations

The semantic relations are advantageously evaluated by querying statements on the base of sets of statements according to the invention in the sense of subject-predicate-object relations. Herein, different evaluations are enabled:

3.1 Implicit Statements

The graph which is the result of the three semantic analyzing processes (cf. Item 2.1, 2.2 and 2.3) is advantageously divided into single statements in the form of subject-predicate-object. An information object represents the subject which is connected via a predicate to another information object, the object of the statement. The predicate is the reason for the link. This can be the name of the key attribute which was the cause for the link, for instance the author of a document. From this, a concrete statement results, for example in the form of "The person Max Mustermann is the author of the document Musterdokument.doc." Apart from the name of the key attribute, also the other analyzing processes (cf. Item 2.1, 2.2 and 2.3) can deliver a pattern for a predicate. In the case of the pattern analysis it would be advantageously the similarity as predicate. Thus, a statement is created, for example in the form of "The document Example1.doc is similar to the document Example2.doc". The semantic analysis leads to statements for example in the form of "The product X is interrelated to the product Y with respect to action." This can for instance be of great importance in the application case of an online shop, in order to display products which are in high probability also of interest for a customer, if this one is looking at a certain product in the shop. Not to forget is the manual link (cf. Item 2.4), by means of which any statements can be formulated. Herein, advantageously entire knowledge fields and subject fields can be created, wherein the concepts advantageously represent own information objects, preferably categories, definitions, subject fields and/or the like. The Uniform Information Layer according to the invention permits to include any data, such that any objects from databases, documents or also web formats such as micro formats or information objects that refer to RDF can be used as information objects. The latter ones are for example persons who are described with the so called specification of friend of a friend (FOAF). The graphs that are automatically created by the solution according to the invention advantageously permit to obtain plenty of implicit statements which can be queried.

3.2 Simple Questions

Simple questions are questions which have a simple structure which can be reduced to a statement in the form of subject-predicate-object. For instance: "Which person is the author of a text dealing with environmental protection?", "How is the person x related to the person y?", Which problem solutions exist for the product x?" or "Which correspondence has been carried on with the person x?". These questions are interpreted as statements according to the invention and are divided into subject, predicate and object. For subject and object, interrelation requests (search requests) are advantageously addressed to the index, the results of which are filtered over the predicate. In the first example, the index would be queried with respect to information objects of the type "person" as well as to information objects which are of the type "document" and contain the keyword "environmental protection". Both selections can be formulated as interrelation request to the index. Afterwards, the predicate comes into play: In the mentioned example, it is delimited by the term "author". The database according to the invention of the relations between the information objects is therefore advantageously queried with a SQL statement, in order to obtain the statements in which results of the search request for the subject are linked to results of the search request for the object. Additionally, the link will be designated with the key attribute "author". Thanks to the set of statements which is delivered as result, the persons for who it was asked can be displayed.

According to the invention, simple questions are advantageously formalised as follows: subject (search request), predicate (reason of the link), object (search request). It is possible that some variables in this query remain free of statements. Thus, the solution according to the invention can advantageously search for any links or can also leave subject and object open, in that it is only searched for special links, for instance all objects which are connected by "friendship".

3.3 Complex Questions

In the sense of the present invention, complex questions are understood as such in which the question is restricted by relative clauses. Examples for this are:

1. "Which person is the author of documents dealing with the subject of environmental protection and is at the same time employee of the company x?";
2. "Which documents with respect to the subject environmental protection have been written by persons who are employees of the company x?"

The questions can be advantageously brought into a form which divides the entire complex question into partial statements. In accordance to the above mentioned formalisation, the form of the two above mentioned exemplary questions is as follows, wherein respectively the first subject is the wanted set of objects, with S=search request for the subject, P=description of the predicate and O=search request for the object:

1. S( . . . ) [P( . . . ) O( . . . ) and P( . . . ) O( . . . )]
2. S( . . . ) P( . . . ) [S( . . . ) P( . . . ) O( . . . )]

The first formalisation expresses that the subject is delimited by two statements: On the one hand, the subject is connected to certain documents by the predicate "author". On the other hand, the subject is also connected to an object which describes a certain company by a predicate "employee".

The second formalisation expresses that the subject connects a certain quantity of documents via the predicate "author" to persons. The latter ones are delimited by the statement that only such persons are considered who are linked via the predicate "employee" to an information object which describes a certain company. This division of questions into partial statements can be advantageously generalised: For each complex question, a wanted set of subjects can be constrained by several predicate-object relations, which are linked by "and" or "or". The objects can also be constrained by several predicate-object relations, which are logically linked by "and" or "or". Herein, a graph for the division of a complex question is created (cf. also FIG. 23). For the subject and the object there is respectively any number of branches, whereas a predicate is always allocated to only one object.

If the question is asked in the described form, the system can work on it. Herein, the statements are advantageously divided into partial statements, selected in the database and afterwards linked. The solution according to the invention advantageously starts at the ends of the graph and continues the work after selection of the partial statements. If two or more partial statements are connected to an object, either a cut-set (And-function) or a join of sets (logical addition) has to be created. The set of results will then be used for the next step within the graph. As a result, there is a quantity of subjects which is placed at the beginning of the graph. In this manner, complex questions can be answered according to the invention, which are based upon statements which have been implicitly created by the automatic semantic link or have been directly modelled in the system. If one wants to obtain a compatibility of the Semantic Web with respect to the generally used methods, there are advantageously two ways to go according to the invention: information objects on the base of RDF, for instance descriptions of persons with FOAF, can be integrated into the system via the Uniform Information Layer. The statements which are then formed by the system can afterwards theoretically be re-exported as RDF graph. A preferred, because much easier variant to query the system according to the invention is given by a web service via which requests can be formulated. Results can then be represented in each user interface. The entire system can thus be advantageously integrated into company portals or special applications.

Another advantageous embodiment of the invention provides that within the scope of a request for an interrelation (interrelation request) only such data representing information will be used for the request for an interrelation (interrelation request) which comprise at least one interrelation to at least one pre-definable item of information.

According to the invention, a context search is realised in this manner, wherein only such items of content will be considered within the scope of the request for an interrelation (interrelation request) which are found in the context of a certain item of content. In this manner, the context search according to the invention permits to find results of interrelation requests in dependence on the context. A search will be thus substantially refined in dependence on the context.

An especially preferred embodiment of the invention provides that the interrelation request is realised as a request addressed to a search engine. Herein, a search engine in the sense of the invention is in particular a program for researching documents and/or data records—which are, in the sense of the present invention, one item of data representing at least one item of information of a data inventory—which are provided or held ready by means of a computing device—also called computer—or in or via a computer network, in particular the internet or an intranet. In the scope of a use of the method according to the invention with respect to the interrelation request for or with a search engine a keyword index will be advantageously created for the document basis—which is, in the sense of the present invention, a result of a search request or an interrelation request—in order to respond to search requests via keywords—which are, in the sense of the present invention, one item of data representing at least one item of information of the interrelation request—by means of a hit list arranged according to relevance. After input of one or more search terms—which are, in the sense of the present invention, an item of data representing an item of information of the interrelation request—a list of links to possibly relevant documents or data records—which are, in the sense of the present invention, an item of data representing at least one item of information of a data inventory—will be delivered.

The requests for an interrelation between the contents of data representing information, interrelation requests in the sense of the present invention, are advantageously themselves data representing information and/or actions. Accordingly and according to the invention, in general interrelations between two successive contents will be advantageously acquired as data representing information of one or two data inventories and their contexts with respect to each other will be considered according to the invention.

The invention is based upon the knowledge that thanks to the consideration or integration of the context of or between items of content, interrelation requests can be further improved and optimized, in particular with respect to the usability of an acquisition of interrelations according to the invention for users. According to the invention, a self-learning solution is realised. Altogether, the acquisition of interrelations between data representing information has been improved thereby, in particular with respect to the manner, scope as well as handling of the acquisition of interrelations as well as to the use of the acquired interrelations. Herein, interrelations can be managed as knowledge according to the invention.

Herein, the method according to the invention puts the knowledge into practice that knowledge is created by connecting contents. In contrast to a use of term networks which are encoded in a so called Topic Map according to ISO/IEC 13250 and are for instance created by consulting enterprises with respect to areas of business or by verticalised knowledge management solutions of software manufacturers, the invention provides a self-learning solution which adapts itself to the requirements and preferences of the respective consumer or user. Accordingly, the functionalities of the method according to the invention can be simply integrated without any problems into existing solutions, in particular data processing systems and/or data processing devices. Costly and training intensive introductions of a solution according to the invention into existing or new projects can be dropped.

The solution according to the invention enables a user to get easily and quickly from one item of content to other contents linked via interrelations. Since advantageously, all contents are repeatedly connectable via interrelations, in particular in groupings according to the invention, a navigation within the scope of an interrelation request can advantageously also lead back to the starting point of the request, i. e. to the interrelation request itself. In this manner, the user can advantageously recognise contexts, in particular with or between uses, which are relevant for instance for his current focus of interest. In a fixed, static hierarchical order of data processing systems, as it exists for instance in operating systems and their application programs usually using tree structures to select contents, this is not possible, since these do not allow a consideration of new order structures.

While otherwise, users of data processing systems enter data via input masks provided by the data processing system, the solution according to the invention advantageously makes it possible to describe data in accordance with a current requirement of the user. So for instance, the solution according to the invention does not rigidly determine the description of an address or a project, as it is otherwise usual, but due to the dynamic data management according to the invention and the design of a corresponding graphic user interface, it enables the user to use it in an extremely flexible and individual manner.

Advantageously, the pre-definable item of information is used together with an acquired interrelation as an item of data representing an item of information of a request for an interrelation (interrelation request). Within the scope of an interrelation request, a user can thus simply input the pre-definable item of information together with an item of content of a result of an interrelation request that has been already acquired before and hand it over to the process carrying out the method.

In an especially preferred embodiment of the invention it is provided that within the scope of a request for an interrelation (interrelation request), at first a request for an interrelation (interrelation request) to the at least one pre-definable item of information as the at least one item of data representing at least one item of information of a request for an interrelation (interrelation request) is realised, then a request for an interrelation (interrelation request) to the at least one result of the request for an interrelation (interrelation request) to the at least one pre-definable item of information as the at least one item of data representing at least one item of information of a request for an interrelation (interrelation request) is realised and finally the at least one result of the request for an interrelation (interrelation request) to the at least one result of the request for an interrelation (interrelation request) to the at least one pre-definable item of information as the at least one item of data representing at least one item of information of a request for an interrelation (interrelation request) is acquired and reproduced as the at least one item of data representing at least one item of information of a request for an interrelation (interrelation request).

Another advantageous embodiment of the invention is characterized in that the pre-definable item of information is a sequence of letters and special characters (search string) that can be selected by a user and/or an application.

In another advantageous embodiment of the invention it is provided that at least one word of a list made on the base of a full text (list of words) and comprising words contained in the full text will be used as the at least one item of data representing at least one item of information of the request for an interrelation (interrelation request).

An advantageous embodiment of the invention provides that the words on the list (list of words) of the words contained in the full text will be arranged in an ascending manner in accordance with the frequency of their presence in the full text and the arranged words will be used in consideration of the frequency of their presence in the full text as the at least one item of data representing at least one item of information of the request for interrelation (interrelation request).

In another advantageous embodiment of the invention it is provided that a pre-definable number of the words arranged on a list (arranged list of words) in accordance with the frequency of their presence in the full text will be acquired and the words of the list (arranged list of words) will be used as the at least one item of data representing at least one item of information of the request for an interrelation (interrelation request). Advantageously, the list (arranged list of words) contains the words with the lowest frequency of their presence in the full text. In another embodiment of the invention the words are advantageously arranged in an ascending manner in accordance with the frequency of their presence in the full text. The pre-definable number is preferably limited to up to 32, in particular since thanks to the pre-definable number the number of attributes which are usable for an interrelation request and can be preferably logically connected to each other can be defined and furthermore—as it has been found empirically—the performance of the solution according to the invention in use by data processing systems can thus be optimised.

According to another proposal of the invention the words of the list are at least partially, preferably completely—i.e. the entire list of words—used in parallel as the at least one item of data representing at least one item of information of the request for an interrelation (interrelation request). Herein, the words of the arranged list of words are advantageously connected to each other in a logical manner, preferably by means of a Boolean logical addition, and the logical addition will be used as the at least one item of data representing at least one item of information of the request for an interrelation (interrelation request). As result the interrelation request then delivers a similarity value, preferably via a search engine. The similarity value is advantageously a percentage number with respect to the similarity, wherein for a similarity value of 100% all the words from the arranged list of words that have been used as attributes for the request in the requested context, especially preferred between two full texts or full text documents, occur and/or are relevant and for a similarity value of 0% none of the words from the arranged list of words that have been used as attributes for the request in the requested context, especially preferred between two full texts or full text documents, occurs and/or is similar or is relevant with respect to the similarity.

An alternative and/or supplementing embodiment of the invention advantageously provides that the words of the list will be used one after the other as the at least one item of data representing at least one item of information of the request for an interrelation (interrelation request).

Advantageously, the connections are acquired like, and preferably with, the dynamically acquired interrelations. In contrast to relational databases where connections of tables provided with data are managed, the solution according to the invention creates links of the acquired interrelations dynamically, preferably in n-to-n relations, wherein the interrelations are advantageously obtained and maintained, i. e. in particular kept up to date, independently according to the method.

According to the invention advantageously all data inventories existing in and/or connected with or integratable into the system are indexed. From the user's point of view, a dissolution of the otherwise existing separation between database and file system, as for instance in search engines, will thus be achieved. The solution according to the invention thereby enables a search of contents independent of the technical realisation of the persistence of data. Herein a quasi-combination of indices and databases is created according to the invention enabling different search options by interrelations, in particular an integration of precise search queries and full-text searches. Search queries are analysed and converted for an internal query of the data sources.

The solution according to the invention advantageously permits an integration of data sources without having to replicate data or to use resources for redundancies. For this, a data processing system according to the invention advantageously comprises a structure which makes it possible to integrate data sources without having to replicate data or to use resources for redundancies (plug-in structure of the data processing system). The involvement of data sources for data migration otherwise requiring a high development effort and large system resources can therefore be advantageously omitted.

In accordance with another proposal of the invention, the solution according to the invention also takes local data inventories into account which can for instance be shared by different users for use in a computer network, e. g. various employees in a company network, in particular. a client-server network. Contents and their interrelations can thereby be used in a company network for instance for market research and/or competition analyses or similar applications.

In another advantageous embodiment of the invention, the connection is created by a syntactic comparison between the at least one item of data representing at least one item of information of the request for an interrelation (interrelation request) and the at least one data inventory. The particularity of the art according to the invention is a syntactic comparison on the basis of rules (keys) that can be respectively described in insertable modules, so-called plug-ins. This has two crucial advantages: On the one hand, valid interrelations specified by the user (e. g. business rules) can be defined and applied to the data inventory. At the same time, this allows for a flexible data structure. On the other hand, interrelations between items of information and options for action (dynamic functions) can be created by the rules. According to the invention, a solution is used here, in which information about actions on the part of a user or automatic processes is provided to all system components (plug-ins) managing data sources in order for them to trigger actions or changes to the data inventory themselves, if required. The syntactic analysis is advantageously applied in combination with other analyses in order to realise quick results and an immediately usable overall system.

Another advantageous embodiment of the invention provides that the connection is created by a semantic comparison between the at least one item of data representing at least one item of information of the request for an interrelation (interrelation request) and the at least one data inventory. Within the scope of the semantic comparison, a semantic network is herein advantageously created from which interrelations can be acquired.

In a particularly advantageous embodiment of the invention, the various possibilities for the creation of connections are applied in combination. Unlike neural networks, the solution according to the invention works with a combination of syntactic and/or semantic analytic processes in order to achieve a high learning speed.

According to an advantageous proposal of the invention the connection is created by manual input, preferably by a select input.

In another particularly advantageous embodiment of the invention, other comparisons for the acquisition of connections can be integrated into the data processing system according to the invention. In this manner, the user can for instance integrate other analytic procedures and/or methods in addition to the mentioned possibilities for acquisition of connections and accordingly expand the data processing system by these according to the user's individual requirements.

Another advantageous proposal of the invention is characterised by at least one electronic use of an item of data representing at least one item of information of at least one data inventory as an item of data representing at least one item of information of the request for an interrelation (interrelation request). A particularly advantageous embodiment of the invention is characterised by an acquisition of electronic uses of data representing at least one item of information of at least one data inventory in accordance with time and/or frequency and use of this acquisition as the at least one item of data representing at least one item of information of the request for an interrelation (interrelation request). Another advantageous embodiment of the invention is characterised by at least one acquisition of an interrelation as electronic use of an item of data representing at least one item of information of a data inventory. Another embodiment of the invention is characterised by the use of at least one reference to a data inventory comprising data representing at least one item of information. By these measures, for instance the use of a file with an application program, advantageously either individually or in combination, can be acquired as an interrelation. Scope and handling of the solution according to the invention can thus be further improved, and user applications can be further individualised. For the analysis, advantageously actions, time and sequence of the user and results of data modifications are logged according to the invention. The data modifications are advantageously verified by a so-called crawler.

The acquisition of interrelations advantageously occurs in a weighted manner. In this manner, the dynamics of acquisition of interrelations can be advantageously further increased or reduced. In a preferred embodiment of the invention, the weighting of interrelations of at least one interrelation already acquired as an item of data representing at least one item of information in a data inventory is modified in dependence on the weighting of interrelations of a subsequently acquired interrelation; preferably the weighting of interrelations is increased (incremented) or reduced (decremented). In a particularly preferred embodiment of the invention, the weighting is not only realised in accordance with a percentage hit accuracy of a search query, but on the basis of the semantic network formed by dynamic acquisition by the solution of the invention, which network is automatically and continuously optimised by numerous parameters, in particular by continuous updating of the acquired interrelations. Details of this iterative process comprising several bifurcations result in connection with the following description of the flow charts shown in the figures of the exemplary embodiments, in particular from FIG. 14.

Advantageously, at least one acquired interrelation is reproduced, preferably by an optical and/or acoustical display device of the data processing system according to the invention or of a data processing device according to the invention, respectively. In accordance with another advantageous proposal of the invention, the weighting of the acquired interrelation is reproduced together with it.

In another embodiment of the invention, weightings are provided with an expiry period in order to down-grade interrelations in dependence on time. Since each user will use the solution according to the invention with different intensity, it is appropriate to use a meter for the expiry period which uses an action as the smallest unit of time. In this case, an action is the calling of an item of content, preferably including processing of the same, and/or the creation of a new item of content from the data processing system. In another embodiment of the invention, the period within which a user has used an item of content, for instance viewed one, is used for determining the expiry period. The expiry period of a weighting of an interrelation is advantageously extended the longer and/or the more often the user has occupied himself with an item of content, since its significance for the user is or must be correspondingly higher.

Moreover, the present invention relates to a data processing system with data representing information in at least one data inventory that is accessible via a data source and that is configured and/or adapted for at least partially carrying out a method according to the invention.

Another advantageous embodiment of the invention is characterised by a graphic user interface for entering and/or reproduction of interrelation requests, connections, interrelations and/or weightings of interrelations. The graphic user interface is advantageously furthermore designed and/or adapted for entering, modifying and/or reproducing data representing information in at least one data inventory. The user interface advantageously provides a graphic user interface which enables action-oriented navigation. This means that in place of possible functions in hierarchically structured menu structures otherwise offered for selection to the user, options for action are offered to the user within the scope of the invention which are reasonable and make sense in the context of the situation or contents called, respectively. In accordance with a particularly preferred proposal of the invention, action-oriented navigation uses a binary basic structure which enables input of contents on the one hand and output of contents, on the other hand. This action-oriented, binary navigation is advantageously realised with cross-device validity, i. e. independently of the respective data processing device.

In a particularly preferred embodiment of the invention, the graphic user interface partitions the optical display area available for reproduction by means of a display device into three areas, wherein the result of a selection of data representing information is reproduced in a first area, an item of information selected from the selection in the first area is reproduced in a second area with a display, and the at least one interrelation is reproduced in the third area. The item of information in the second area selected from the selection in the first area is preferably reproduced as a preview or as full display of the item of information. The display area can also be provided in the form of a window by the display device. Another proposal of the invention is characterised by a horizontal or vertical layout. The size of the areas can be advantageously set or adjusted.

In another advantageous embodiment of the invention, reproduction occurs at least partly in selectable form, i. e. the reproduced interrelations themselves are for instance designed as menu items for options for action and/or as connections in the form of a link and can be used by selection, for instance by so-called "clicking-on".

Contents or documents comprising contents are advantageously reproduced within the scope of a preview by the data processing system. In this manner, the possibilities of orientation for the user in the interrelations and contents are further improved. During navigation or controlling, the preview is advantageously reproducible by data inventories, such that the user can gain a quick overview of interrelations. This preview advantageously contains a summary of the content, for instance an Internet page reduced with regard to the elements or components shown, or a summarised text. Thereby, otherwise existing restrictions, which are present for instance in operating systems giving a preview of documents in the form of small pictures (so-called thumbnails), in the form of beginnings of texts, or in the form of program or document symbols (so-called icons), can be eliminated in accordance with the invention.

In a particularly preferred embodiment of the invention, the data processing system according to the invention is used for dynamic organisation of information and/or processes, preferably within the scope of a software running on a computer.

The data processing system according to the invention is advantageously part of a database application, or at least usable together with a database application.

Furthermore, the subject of the invention relates to a data processing device for electronic data processing comprising a control and/or computing unit, an input unit and an output unit which is configured and/or adapted for at least partially carrying out a method according to the invention, preferably using at least a part of a data processing system according to the invention.

In another advantageous embodiment of the invention, a data processing device for electronic data processing comprising a control and/or computing unit, an input unit and an output unit is provided, characterised by a use of a data processing system according to the invention.

In an advantageous embodiment of the invention, the data processing device is designed as a mobile terminal, preferably as a mobile terminal which can be used and operated in mobile networks. Particularly preferred is an embodiment of the data processing device as a mobile telephone.

The data processing system according to the invention is advantageously configured in such a way that it can be run under a Java VM, so that the data processing system can principally be used on all mobile terminals. In a particularly preferred embodiment of the invention, the data processing device supports the special ergonomics of the data processing system.

A preferred embodiment of the solution according to the invention advantageously comprises and realises the following procedures, systems and/or devices for acquisition of interrelations between data representing information:

Based on findings of linguistics, epistemology and neurology, interrelations between contents (data representing information) are acquired, wherein the interrelations are acquired dynamically as modifiable, advantageously increasable or reducible n-to-n connections (n: natural, whole number) in accordance with neuronal patterns or associations in the human brain, respectively.

Just like the human brain condenses and processes stimuli of its sensory organs as mental presentations to mental representations—for instance, the human brain derives a movable object from synchronically activated stimuli by means of the visual system of perception—interrelations between contents (data representing information) are acquired in the solution according to the invention. In iterative processes, information or contents, respectively, can be condensed to knowledge on the basis of the correspondingly acquired dynamic interrelations. Furthermore, according to the invention, the interrelations acquired in this way can themselves be used as new content in the form of data representing information, for instance as options for action which are offered to the user to select from, or enter into process controls or the like within the scope of automated processes. Herein, the solution according to the invention is advantageously pragmatic and self-organising, so that configurations by the user are not required. At the same time, the solution according to the invention still allows open controls by the user.

Within the scope of the acquisition of interrelations, different methods for producing, modifying and dissolving dynamic n-to-n connections are advantageously applied in combination with each other, in particular connections by manual inputs, connections by syntactic comparisons and/or connections by semantic comparisons. Furthermore, mathematical-statistical analytical procedures can be used to acquire interrelations. The interrelations acquired by connections are advantageously provided with a weighting. Herein, this weighting is advantageously realised with values, preferably values between 0 and 1, corresponding to no interrelation (value 0) or an immediate interrelation (value 1).

Connections of interrelations by manual inputs of the user can be provided with the greatest possible weighting value, in the present invention 1, i. e. the weighting of the connection will get the highest and fixed value. Herein, in particular the ergonomics of action-oriented logic described in more detail in the following is used. Alternatively, a smaller value may be set in order to let the connection enter into the semantic network.

With connections of interrelations by syntactic comparisons and/or rules, the contents (data representing information) of files and/or databases or defined parts of contents are searched as a data inventory for matching words, word components or character strings which correspond to the contents (data representing information) of the interrelation request. By this quick and valid connection which provides a kind of basic structure for interrelations, the independent acquisition of interrelations, the so-called "self-learning" of the solution according to the invention, is accelerated.

With connections of interrelations by semantic comparisons, dynamic interrelations are advantageously acquired based on, or by means of, the sequence of contents (data representing information) of data inventories (files and/or databases) and/or the sequence of uses of contents (data representing information) of data inventories (files and/or databases). Herein, the solution according to the invention advantageously uses findings of implicit semantics. The semantics are called implicit because in the present case, it is not explicitly modelled by a conceptual network (topic map) or semantic rules of linguistics, but based on the knowledge that interrelations between contents such as meanings within a language are not created by definition, but developed dynamically by the use of the same. Meanings of a language are thus developed by the use of the language, and interrelations between contents according to the invention by the use of these contents. To that extent, semantics cannot be abstracted from language practice or, in the present case, from the contents.

In the technical realisation of connections of interrelations by semantic comparisons, each dynamic connection is given an intrasystem value between 0 and 1, wherein the value 0 shows that there is no interrelation, and the value 1 shows that there is a direct interrelation, which was created manually or by syntactic comparisons. The solution according to the invention logs all actions of the user with the data processing system or the sequence of all called or used contents, respectively, for instance edited contents. As already explained, contents are understood to be data representing information of an arbitrary data inventory, for instance of a file and/or a database, which can originate from different data formats and from different data sources.

If two items of content succeed each other, a latent connection is created. If this succession appears repeatedly, the connection is strengthened. Each connection is advantageously also provided with an expiry period of a pre-definable time unit, wherein the value of a connection is attenuated in a time unit and finally tends toward the value 0 after several time units.

Beyond the direct succession of two items of content, the solution according to the invention advantageously provides groups of content calls which form a pattern. Herein, a pattern means a succession of content calls which recur independent of their order. The patterns can be of different sizes and comprise different numbers of items of content per succession and advantageously form a so-called cluster which forms a subject on a semantic meta level beyond the interrelation. Such a subject could in turn be designated as an interrelation request with the aid of a syntactic comparison for acquisition.

Furthermore, the solution according to the invention is able to determine the relevance of acquired interrelations for the respective user on the basis of the semantic comparison. In this manner, the solution according to the invention avoids an excessive flood of information and can answer interrelation requests of the user more precisely and in a more focussed manner. The relevance can furthermore be advantageously used by the solution according to the invention for a self-organising maintenance of the data processing system, for instance in order to remove data which are not used, which are old and/or unimportant or have become unimportant which would otherwise burden the data processing system.

With interrelation connections by semantic comparisons, it is possible by an appropriate configuration to advantageously analyse contents and/or uses of contents in accordance with individual interests of a user, in the following referred to as interest or action analysis.

An interest analysis examines which content categories the user preferably needs in the respective context. In this manner, the solution according to the invention trains the user-specific rules for the syntactic analysis of contents. If the user for instance needs invoices and orders when calling a set of addresses, these relations are will be advantageously displayed by the data processing system according to the invention. The solution according to the invention understands content categories to be contents which are formally similar, for instance electronic mail (e-mail), addresses, invoices, orders, project plannings, appointments, and the like. Just as with semantic comparisons, the results of the interest analysis are represented by a dynamic network the relations of which can be increased or reduced.

Thanks to this interest analysis, it is possible to restrict the contents, uses of contents and/or aspects of a subject of contents which are interesting for the user to a narrower focus. A subject in this context is a group of contents which—as explained above—has been identified and summarised within the scope of a semantic comparison or which results from a queried and acquired interrelation. The interrelation request can advantageously be initiated in different manners, for instance by dynamically acquired uses of the data processing system by the user or by manual or—if language recognition and natural language interpretation by means of the data processing system according to the invention have been integrated—oral interrelation requests placed with the data processing system, for instance in a search field provided for this purpose by a graphic user interface for controlling the data processing system according to the invention.

An action analysis examines which uses of contents the user preferably needs in the respective context. Therefore, not the contents, but the actions associated with the contents, which are advantageously processed into options for action in dependence on variables such as content, type of content or subject by the solution according to the invention, are acquired in a networked manner. For each called content or interrelation request, the solution according to the invention is able to dynamically offer options for action which make sense to the user in the respective case or which are particularly probable based on his usual actions. So for instance, it makes sense that a drawn-up invoice is entered in a corresponding data processing system or a like application, or that a reply to an email can be created.

With an advantageous analysis in accordance with patterns in the contents and/or their uses, a so-called pattern analyser is advantageously used in the present case, a process which searches unstructured contents for patterns which it recognises as independent content or which it uses for a summary of contents.

The so-called pattern analyser recognises for instance an address or a picture in the text and can use this information in order to make it available as independent content. In this manner, Internet pages can be used for an automated address research. The pattern analyser thereby advantageously takes up the concepts of the described semantic analysis according to the invention. Selected contents, for instance emails, are advantageously automatically evaluated and provided as structured information.

As already explained above, subsequent to the semantic analysis, the analyser verifies whether there are connections between the links and whether a meta link can be established.

For the creation of meta contents or identification of subjects, respectively, the semantic analyser verifies at first how many links there are to a content. When a critical number has been reached which is dynamically definable, and if there is no meta content yet which contains the set of links of the content examined by the analyser as a subset of its links, a new meta content will be created. For this purpose, the individual items of content are merged and summarised. This can be advantageously done by means of the pattern analyser or other analytic procedures or methods.

If a subject exists and the connections fall below the critical number, the meta content will be deleted. Meta contents can advantageously be managed via a corresponding plug-in.

Principally the solution according to the invention is able to integrate unlimited data inventories in the form of files and/or databases of different formats and from different data sources into the data processing system. Herein, the data sources should neither be imported nor modified, in order to remain advantageously functional and usable within their original system context. This serves the security of investment and furthermore accelerates or supports an implementation of the solution according to the invention. For this purpose, the data processing system according to the invention advantageously comprises a central data management—in the following referred to as "repository"—which contains references to the various data inventories and data sources. Herein, not the complete contents are memorized, but only references to the respective data. In this manner, double data management can be avoided.

As already explained above, the solution according to the invention is able to integrate data representing information as contents from different data inventories—both databases and files—in different formats from the most different data sources, for instance via the Internet or a local company network, identify their structures and identify the detected interrelations between the contents or content components, for instance the sender of an email. Herein, the individual content components are advantageously related to corresponding content components of other contents. By this measure, the solution according to the invention is accelerated with regard to searching contents of data inventories—in particular also full texts—for words, word components and/or character strings.

This process of crawling/searching contents of data inventories for words, word components and/or character strings—subsequently also referred to as "crawler"—is advantageously executed by a data processing system according to the invention in the background of the application of the solution according to the invention and periodically searches for new and modified contents which are preferably temporarily held for analysis in temporary files. As soon as the analysis is completed, the temporary files are deleted.

The solution according to the invention can be advantageously used in a manifold manner. First of all, data are organised in a completely new way. This organisation differs from the full text search and directory hierarchies. The first one leads to a complex quantity of search results, the latter one leads to a rigid and unequivocal allocation of information objects. But information objects are often of importance in different and changing contexts. The solution according to the invention permits a purposeful access to information by selecting a context. This can be any information object, for instance a person, a result, a subject definition or any other information object, such as for example a process step. These interrelations are dynamic, i.e. they can change with the time in accordance with the information demand of a group or a person. For each context the item of information is displayed which is interrelated with respect to its meaning. Finally, the solution according to the invention is ideal for modelling knowledge by means of existent resources from which a set of statements is created which can be queried in a target-oriented way. Knowledge can already be extracted by a full-automatic analysis of the data without the statements having to be deposed in RDF or OWL. A combination with concepts which are interrelated to an ontology can be realised with the solution according to the invention without any problems. Thanks to the "reasoning" according to the invention, knowledge in a company or a research institution becomes transparent and concrete answers instead of search results become possible.

BRIEF DESCRIPTION OF THE DRAWINGS

Further details, characteristics and advantages of the invention are explained in the following in more detail based on the description of the exemplary embodiments shown in the figures of the drawing. In these figures.

DETAILED DESCRIPTION OF THE INVENTION

The hardware respectively software concept realising an acquisition according to the invention of interrelations between data representing information including the user guidance results in particular from the context-sensitive management of information according to the invention and/or actions in such a way that a verifiable interrelation is provided.

The data processing system consists of several components which in turn contain further sub-components. In the following, the respective main components are described in connection with FIGS. 1 to 13 to provide a general overview of the architecture of the data processing system. The background of the architecture presented and described here is that the components do not imperatively have to be executed within one application, but a division into several applications and systems is also possible. In this manner, both a so-called standalone and a so-called client/server application are supported.

Figure 1:
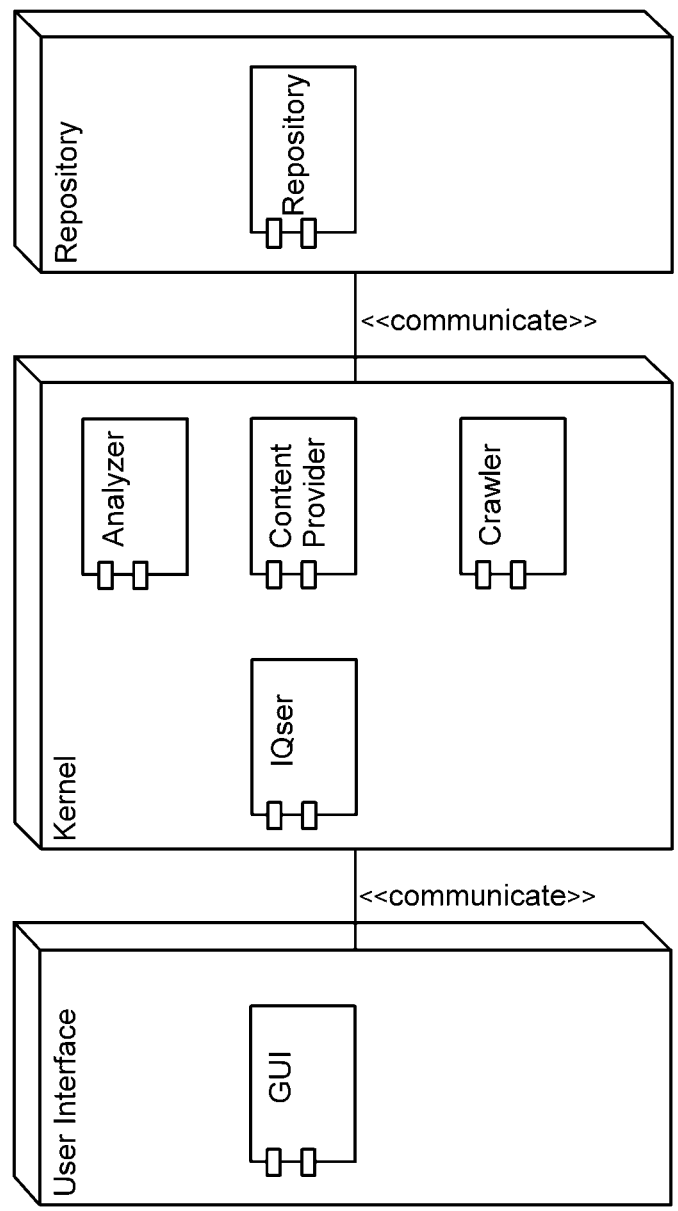
FIG. 1 shows a block diagram of the principal components of a data processing system according to the invention.

As can be seen from FIG. 1, the data processing system comprises a user interface, a kernel and a so-called repository.

The user interface (subsequently referred to as GUI) is the interface to the user. Herein, the user interface (GUI) is realised and designed in such a way that the ergonomic requirements of the user are completely met. In the present case, the user interface (GUI) is platform- and device-dependent, respectively, and is correspondingly individually adjusted to the capabilities of each platform or data processing device. In the present case, for instance implementations of the user interface (GUI) for PCs, PDAs, web or HTML applications, mobile telephone or WML/WAP applications are provided which are preferably realised by means of, or as, JAVA applications.

The kernel is the central application core of the data processing system, in which all components converge and are connected with each other. The kernel itself is divided into further sub-components, subsequently referred to as IQser, content provider, crawler, logger or tracker (not explicitly shown in FIG. 1), respectively, or analyser.

Figure 2:
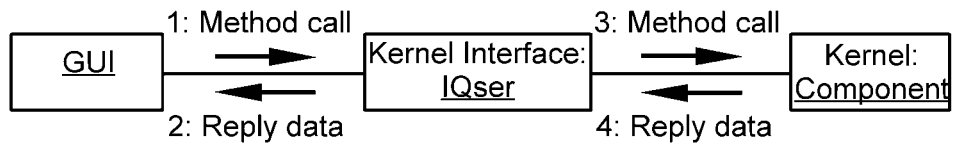
FIG. 2 shows a principal exemplary embodiment of a communication between selected components of the data processing system according to the invention according to FIG. 1.
Figure 3:
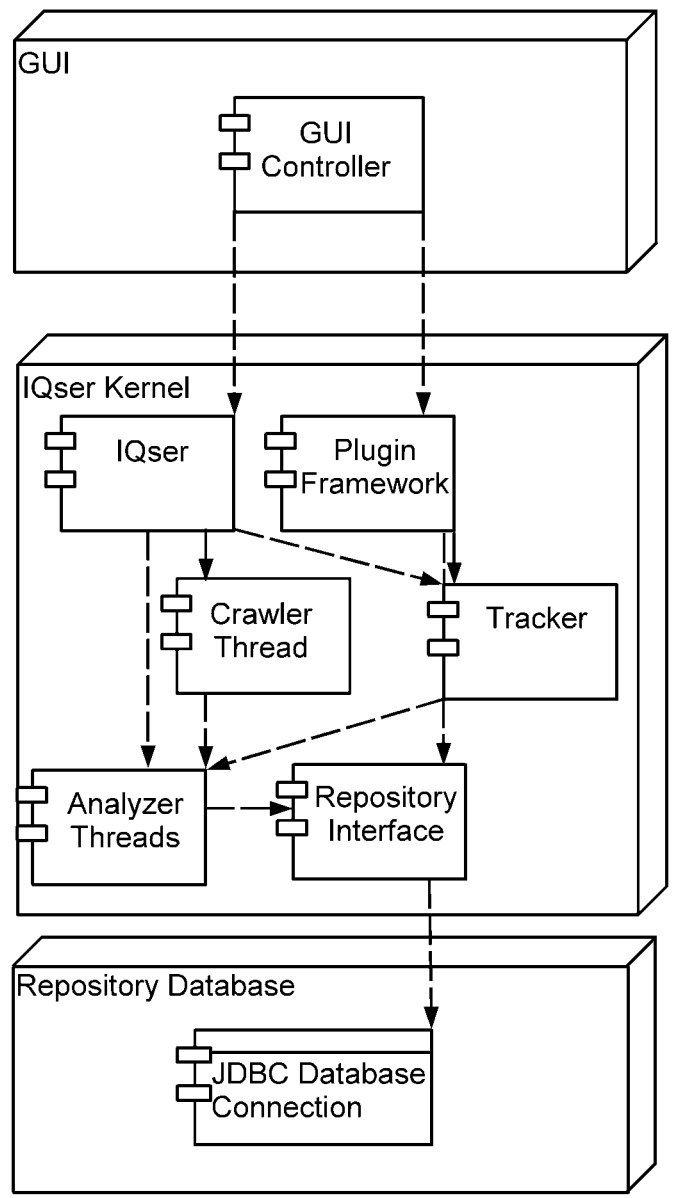
FIG. 3 shows a block diagram of another principal exemplary embodiment of a communication between selected components of the data processing system according to the invention according to FIG. 1.

The kernel provides an interface to the graphic user interface (GUI), and is subsequently referred to as IQser component. Herein, the respective method calls of the user interface (GUI) are forwarded to the respective appropriate components and processed correspondingly before return to the user interface (GUI), if required, as can be seen from the principle shown in FIG. 2. The respective requested tasks according to FIG. 2 are executed by the respective components provided for this purpose. FIG. 3 provides an exemplary overview of the connections among the individual components.

Furthermore, the IQser component is the controller unit which controls the accesses to the repository or repositories and the crawler and analyser processes. Furthermore, in the present invention the IQser component realises the object of integrating the respective content provider into the system.

The content provider component is an abstract component. In the present invention, it is a framework which makes it possible to integrate any data source into the data processing system. This renders the overall system very flexible, and the latter can be integrated into the user's infrastructure.

The task of the crawler component is to search for new content objects or for modifications of existing objects. All modifications or innovations are synchronised in the repository, so that the repository is always up to date. The process realised by the crawler component runs in the background and is started via a freely definable interval.

The task of the logger or tracker component not explicitly shown in FIG. 1 is to log any activity of the user with a content (subsequently also referred to as content object). This logging is required in order to acquire certain processing or usage patterns of the user in relation to different content objects in the analyser at a later time, and to create or delete less relevant interrelations (so-called "weak links") between objects, if required.

In the present invention, the analyser component runs as an independent process in the background of the data processing system and assumes several tasks. For a semantic comparison, the analyser component searches activities or utilizations logged by the logger or tracker component, respectively, for patterns and creates or deletes the said interrelations in the repository. The data processing system can thereby dynamically and independently recognise and quasi learn interrelations between contents and their uses. With syntactic comparisons, the analyser component compares the actual content of a data inventory (content object) with text fragments which point to other data inventories (content objects).

The data processing system refers to external data inventories and uses the latter for the acquisition of interrelations. These can be entries in external databases, for instance emails or addresses, but also documents and objects of the data processing system itself. When the user follows an interrelation reference, the data set or the external document opens in the appropriate application. When the user accesses a data inventory via network connections, the document will open for instance in an additional browser window after it has been converted correspondingly by the data processing system.

The repository is the interface to data management. This is where interrelations and/or references to the data inventories (content objects) and their respective connections are managed. In FIG. 1, only one repository is shown in an exemplary manner. It is also possible, however, to integrate several repositories into the data processing system, so that for instance local, server-based interrelations and data inventories can be integrated into the respective user system.

Figure 4:
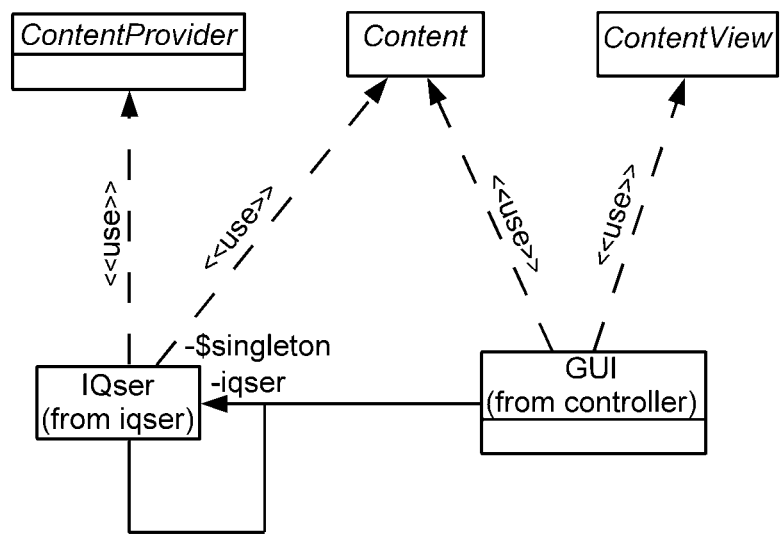
FIG. 4 shows another principal exemplary embodiment of a communication between selected components of the data processing system according to the invention according to FIG. 1.

The data processing system further comprises an interface for integrating data inventories in order to be able to process every conceivable type of contents in the form of data representing information. Since usually, not all possibilities and types of integration of data inventories can be predetermined in advance, the content provider component is implemented as a programmable interface in the present invention. This enables developers to individually program other content providers which can then be used by the data processing system. This programming interface is subsequently also referred to as plug-in and is shown in FIG. 4.

The plug-in (FIG. 4) consists of several objects which must be implemented by the developer:

ContentProvider: This is the interface to the kernel and provides the methods required for processing contents.
Content: The content object is the actual content. It is used to exchange contents between the components.
ContentView: Interface to the GUI. This is used to implement the representation and the possible actions and uses of the contents, respectively.

Figure 5:
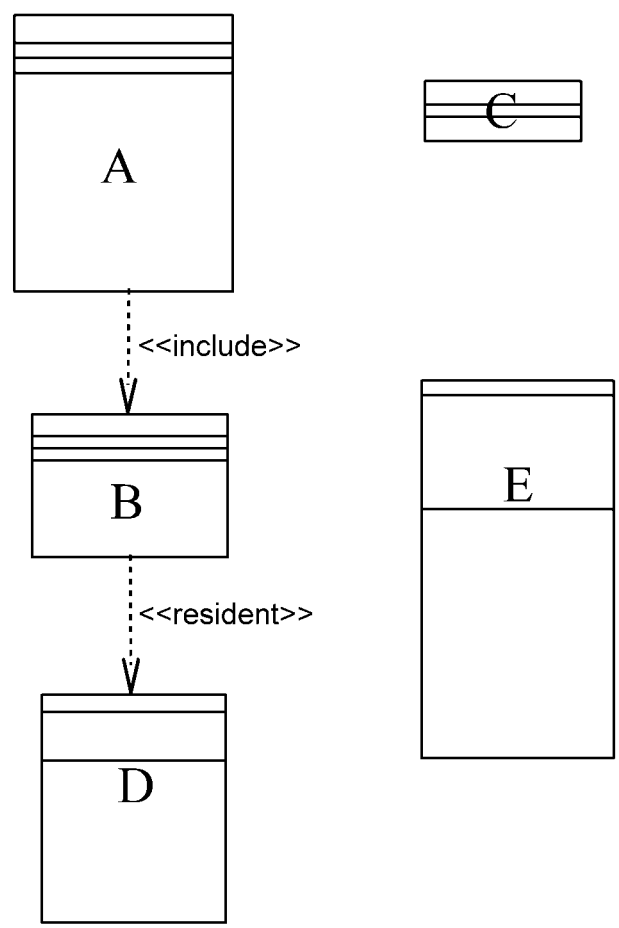
FIG. 5 shows a block diagram of a principal exemplary embodiment of a program implementation of a communication between selected components of the data processing system according to the invention according to FIG. 1.

As can be seen from FIG. 5, plug-ins are managed by two objects, the PluginManager and the plug-in. The PluginManager's task is to search for installed plug-ins when the IQser component of the data processing system is started, and to load and initialise existing plug-ins. The plug-in itself in the present invention is used as a data container. It contains a unit of the ContentProvider and the configuration of the respective plug-in.

For the development of a new plug-in, the developer must implement the objects ContentProvider, Content and ContentView. A plug-in is configured via a file (presently plug-in.xml) which must be present in the respective plug-in directory. If it is missing, the directory is not taken over as a plug-in by the component of the data processing system referred to as IQser in the present invention.

Figure 6:
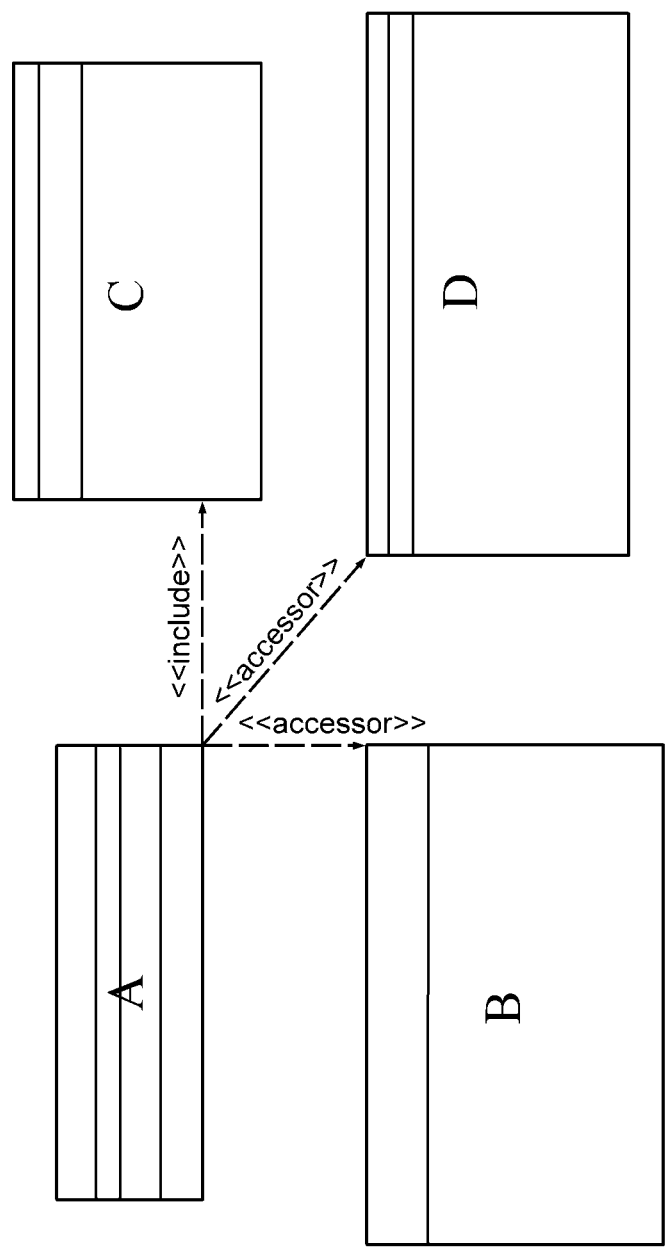
FIG. 6 shows a block diagram of another principal exemplary embodiment of a program implementation of a communication between selected components of the data processing system according to the invention according to FIG. 1.

FIG. 6 in an exemplary manner shows the processes realised by the crawler component which run in the background of the application of the data processing system. Herein, the data inventories are searched for new and modified contents, and these are memorized for analysis for instance in the form of a table. In the present invention, the processes are carried out with low priority in periodic intervals.

Figure 7:
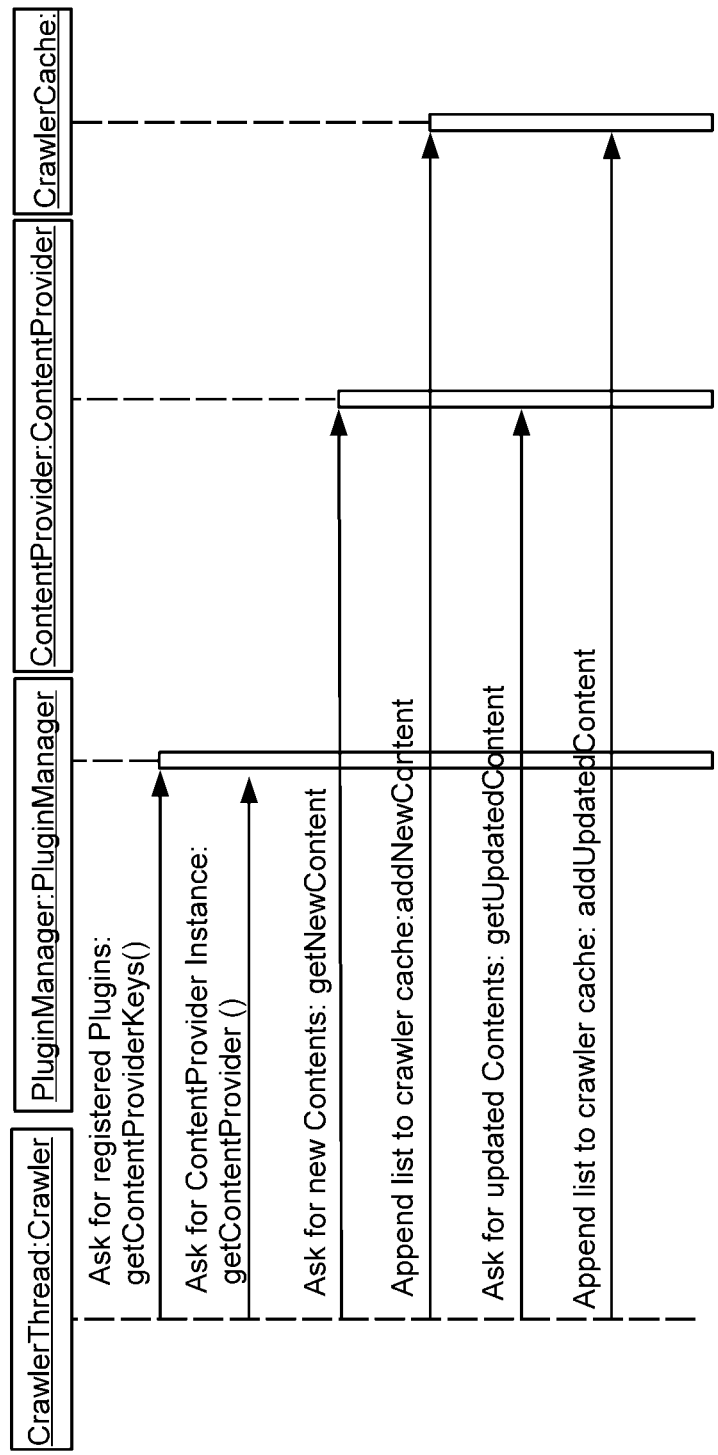
FIG. 7 shows principal details of the communication according to FIG. 6.

As can be seen on the basis of FIG. 7, the so-called crawler obtains the list of installed plug-ins from the PluginManager and processes them successively. In doing so, each ContentProvider of a plug-in is queried for new or modified content objects. The ContentProvider respectively returns a list with content IDs. These lists are then memorized by the crawler in a cache table. The table is then in turn processed by the analysers.

Figure 8:
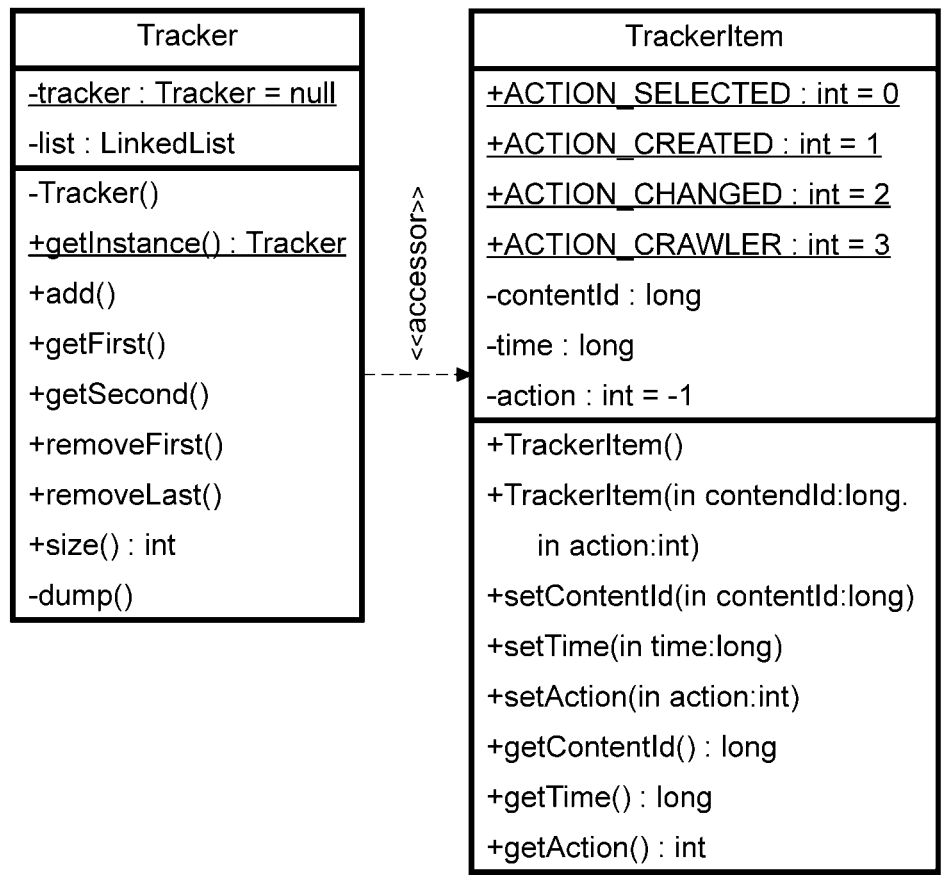
FIG. 8 shows a block diagram of another principal exemplary embodiment of a program implementation of a communication between selected components of the data processing system according to the invention according to FIG. 1.

The task of the so-called logger or tracker component shown in an exemplary manner in FIG. 8 is similar to that of the crawler component. The tracker or logger logs the actions of the user to content objects. By this logging operation, patterns in the processing and/or use of contents are later acquired by the InterestAnalyser and put to further use. In this manner, interrelations between contents can be created dynamically. These interrelations are weighted low and, as soon as they have not been used for a longer, pre-definable period, are quasi forgotten by release. The period over which the tracker or logger is to log the activities can be configured. The shorter the period, the faster the processing. The longer the period, the higher the possibility to acquire processing or usage patterns.

Figure 9:
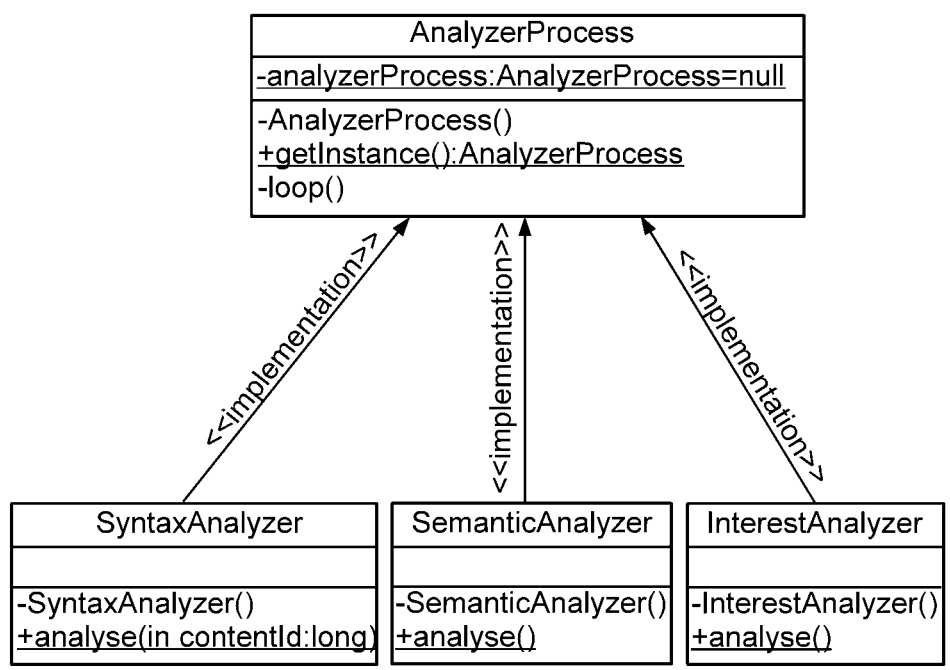
FIG. 9 shows a block diagram of another principal exemplary embodiment of a program implementation of a communication between selected components of the data processing system according to the invention according to FIG. 1.

The analyser shown in FIG. 9 is a process which analyses the contents "found" by the crawler in accordance with various criteria in the background of the data processing system. The analyser itself in the present invention consists of the following sub-components and -processes, respectively:

IndexAnalyser: Analyses the contents for keywords required for interrelation acquisition.
SemanticAnalyser: Analyses the contents according to semantic criteria in order to acquire interrelations between contents.
SyntaxAnalyser: Analyses the contents for syntactic interrelations with other contents.
InterestAnalyser: Analyses contents for patterns in processing or use by the user.

If at least two events have been entered in the log (tracker), an analysis can be started by calling the analytical process. For this purpose, the analyser views the first two entries of the log. If the second entry is not an event which was triggered by the selection (e. g. "for display") of an item of content, the syntax analysis will be started (cf. FIG. 11). If it was an interrelation (subsequently also referred to as selection), syntax analysis will be skipped. If both entries are events which were triggered by the user, each of the contents is examined both in the semantic and in the interest analyser in the present case. Subsequently, other analytical steps may follow. When all analytical steps have been carried out, the first entry is deleted. Now the entire process is repeated until only one entry is left in the log.

Figure 14:
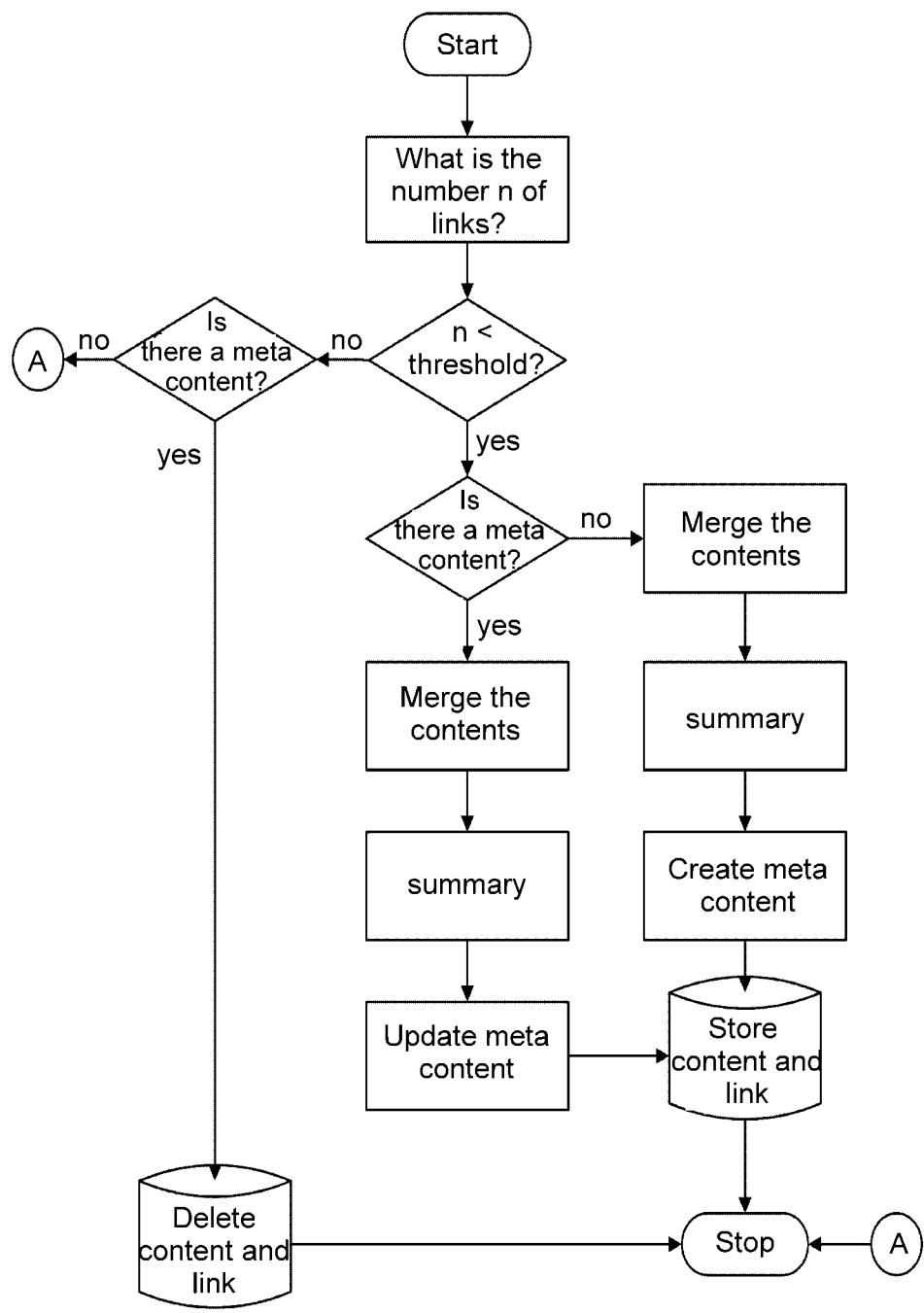
FIG. 14 shows a flow chart of another exemplary embodiment of an interrelation acquisition according to the invention.

FIG. 14 for instance shows the process of a so-called meta analyser. The meta analyser verifies whether the number of connections to an examined content exceeds a limiting value n. If not, it is verified whether there is a meta content which— if it exists—must be deleted. If the limiting value is reached, it is also verified at first whether there is a meta content. In both cases, all linked contents are merged and summarised. If there has already been a meta content, the latter is updated by the summary. If there has been no meta content, yet, it is created and deposited in a database.

Figure 10:
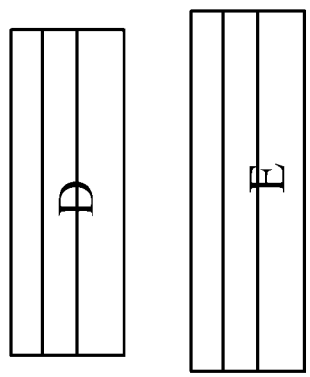
FIG. 10 shows a block diagram of another principal exemplary embodiment of a program implementation of a communication between selected components of the data processing system according to the invention according to FIG. 1.
Figure 10:
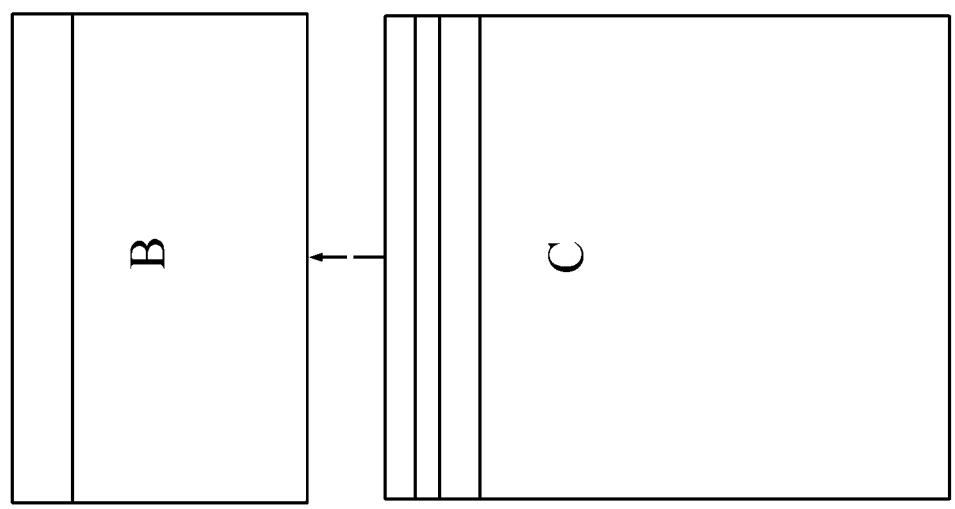
Figure 10:
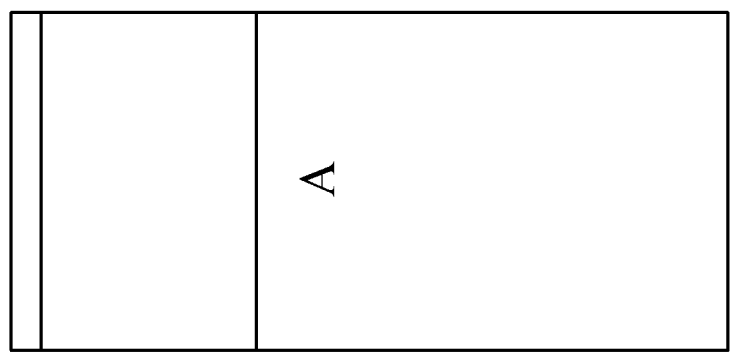
Figure 10B:
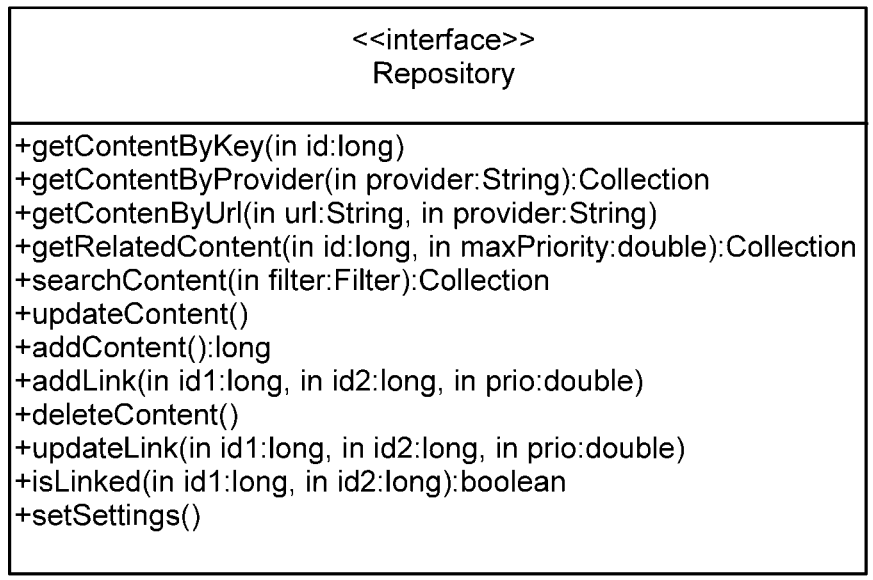
Figure 10D:
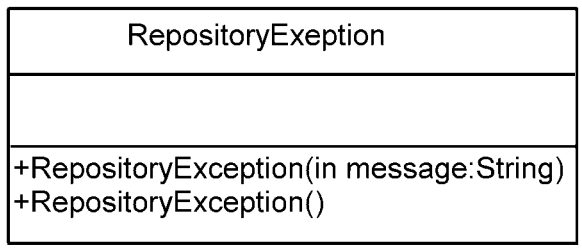
Figure 10E:
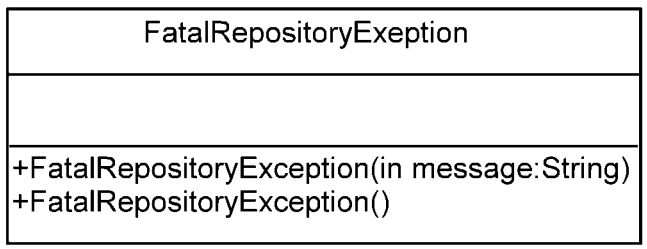

The repository shown in detail in an exemplary manner in FIG. 10 is the interface to the data inventories. It assumes the memorization of all data relevant for the kernel; in the present invention, these are in particular:

An index to all contents.
Interrelations or connections of contents to other contents.
Temporary information regarding the order of processing of contents by the user (tracker).
Temporary information on new and modified contents (crawler).
An index of all key values of the contents (weighting).

When the semantic analysis is started, it is verified whether a connection between the two contents already exists. If there is none, a connection with a low value larger than 0 is created for weighting. If a connection exists already, the SemanticAnalyser will query whether the weighting is smaller than 1. If this value is 1, the analysis is aborted, if it is smaller than 1, it is continued. Now the weighting of the connection is increased by a smallest value larger than 0. Subsequently, it is verified whether the resulting weighting is larger or equal to 1. If the value is smaller than 1, the semantic analysis is terminated. If the value is larger or equal to 1, the weighting is reduced to a largest value smaller than 1. Subsequently, all other existing connections are called, and their weighting is reduced by a factor corresponding to the reduction of the currently examined connection. After that, the SemanticAnalyser is terminated.

Figure 11:
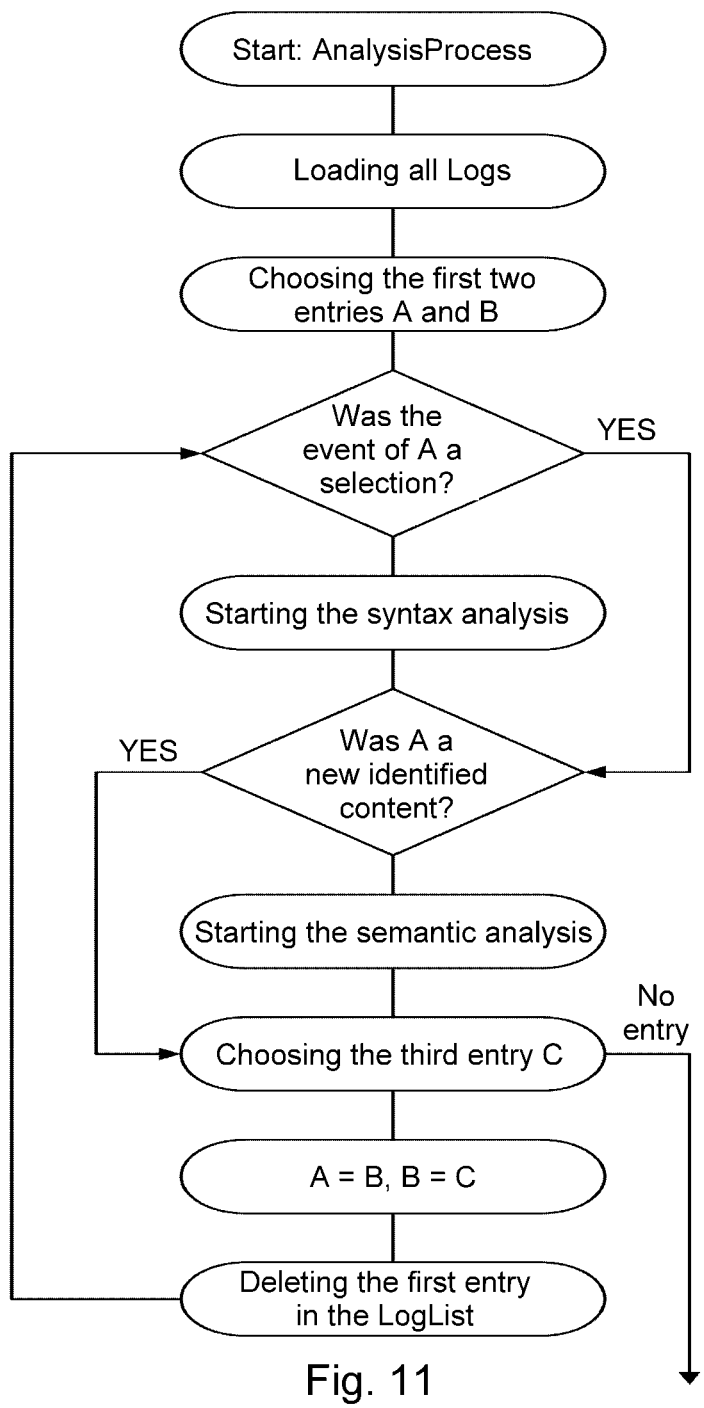
FIG. 11 shows a flow chart of an exemplary embodiment of an interrelation acquisition according to the invention.
Figure 12:
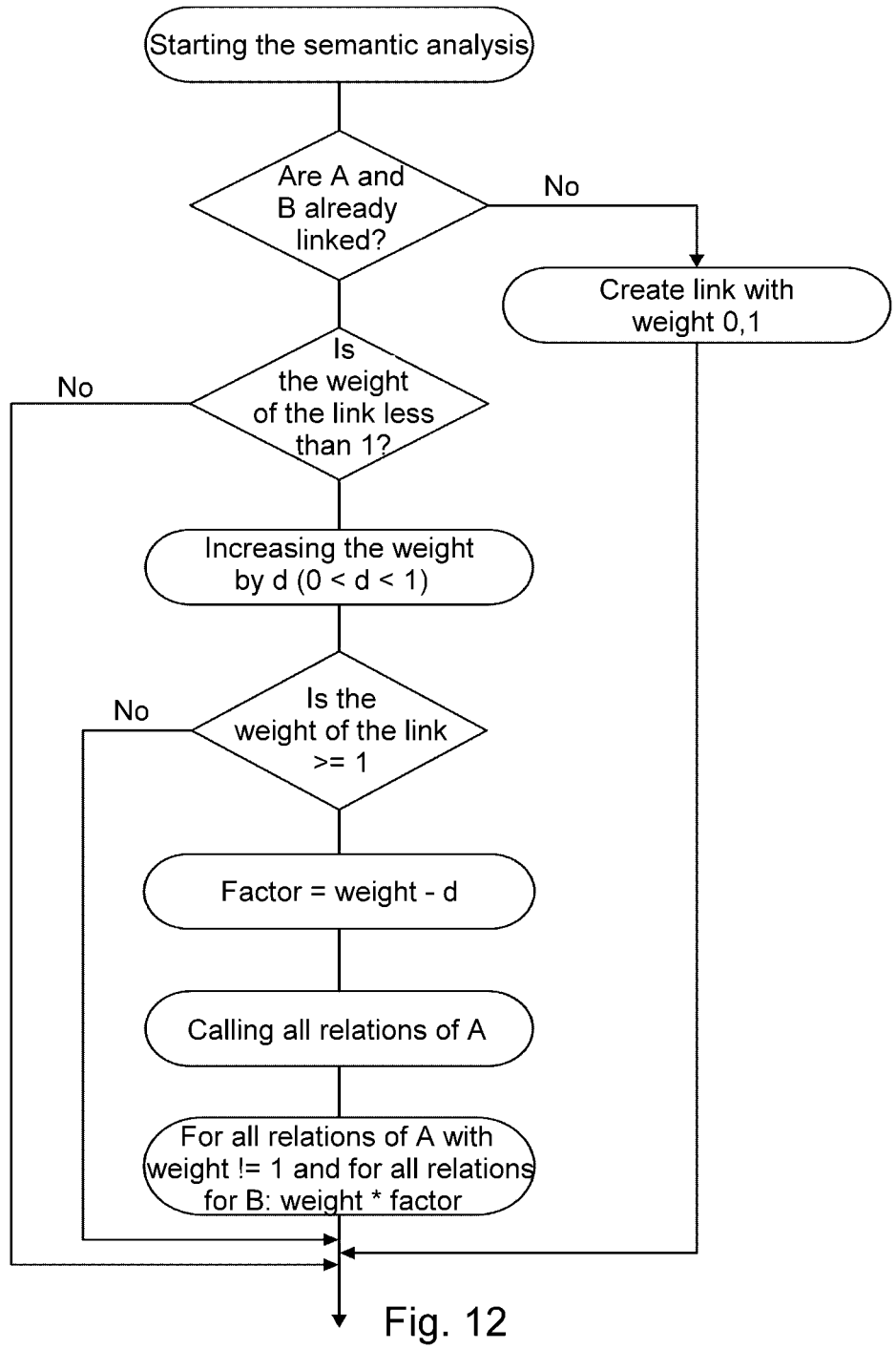
FIG. 12 shows a flow chart of another exemplary embodiment of an interrelation acquisition according to the invention.
Figure 13:
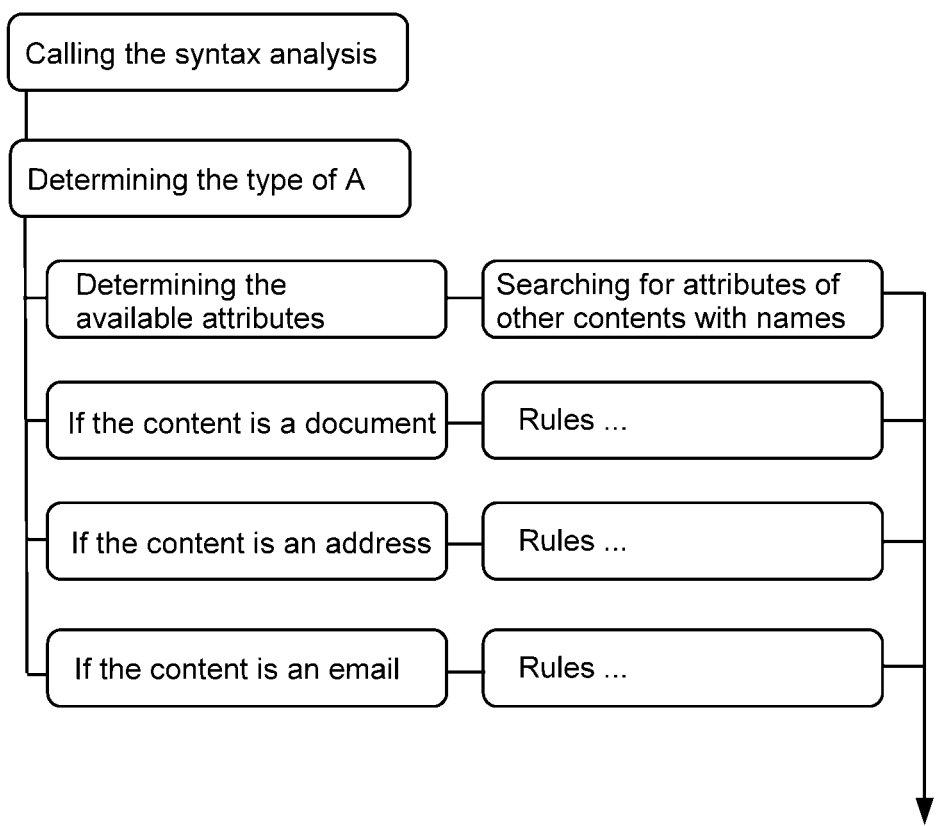
FIG. 13 shows a flow chart of another exemplary embodiment of an interrelation acquisition according to the invention.

FIG. 11 shows the iterative analytical process of interrelation acquisition. In the present invention, as already explained, various analytical processes are used in combination. Within the scope of interrelation acquisition, the analytical process is started by an entry in the tracker (event log), and is finished when only one entry remains in the tracker. As already explained above, it is the task of the analyser component to independently recognise the interrelations between the contents. For this purpose, the data processing system uses in particular a syntactical and a semantic analysis in combination. FIG. 12 shows the sequence of the processes explained above within the scope of a semantic analysis. FIG. 13 shows the principal structure of the processes within the scope of a syntactic analysis.

FIG. 11 shows the principal steps of the procedure realised by the analyser component. Within the scope of calling the analyser component, log files or the database entries (logs) are processed in the chronological order in which the individual items were written. If any entries have been processed in this manner, they are deleted from the list, while at least the last action is saved, however. The length of the list of actions in the log file or the database table also depends on how fast the analyser works, or how much computational throughput is assigned to the secondary thread. The thread of the IQser component or the actions carried out by the user of the data processing system, respectively, always have priority. As soon as a new action is written to the log file and the analyser has not been active yet, the analysis for interrelation acquisition is started. The following situations can lead to a call of the analyser:

At the start of the data processing system, at least two entries from the last session are already in the log.

The crawler has identified new contents, for instance by a new plug-in.

The user creates a new content.

The user selects an item of content from a called list.

The SyntaxAnalyser determines the rules for syntax analysis by calling the "keys" for the specific content to be searched. These "keys" are attributes describing which information modules (data fields) and data types are to be used for determining contexts. From the keys, the analyser compiles a filter which triggers a search through the entire acquired data inventory. Finally a connection is created to the contents found which, depending on the implementation and the requirements of the user, is weighted with 1 or a largest value smaller than 1, or the hit accuracy.

As explained above, all contents can be linked in interrelations with any type and any number of other contents. Interrelations are possible both in a cross-category manner and within one category. For instance, addresses can be linked with addresses, but addresses can also be linked with projects.

There is no hierarchical order. The data processing system differentiates static and dynamic connections for interrelations or their acquisition, respectively. Static connections are always displayed and can be produced and edited by the user. Dynamic connections are automatically created by the system with a weighting. The following are the criteria for weighting:

The frequency of calling a content.

The frequency of calling of contents in the context created by the interrelation.

The age of the last call of the interrelation or of the linked contents.

Search results of an interrelation request are furthermore weighted according to the frequency of the searched content in the respective interrelation.

As already explained, there is an internal threshold value beyond which a dynamic connection is displayed or not. The value (weighting) changes in dependence on the user behaviour or the evaluation of the log of all actions carried out by the user with the data processing system, respectively.

The interrelations are represented as dynamically linked objects in the data processing system.

Figure 15:
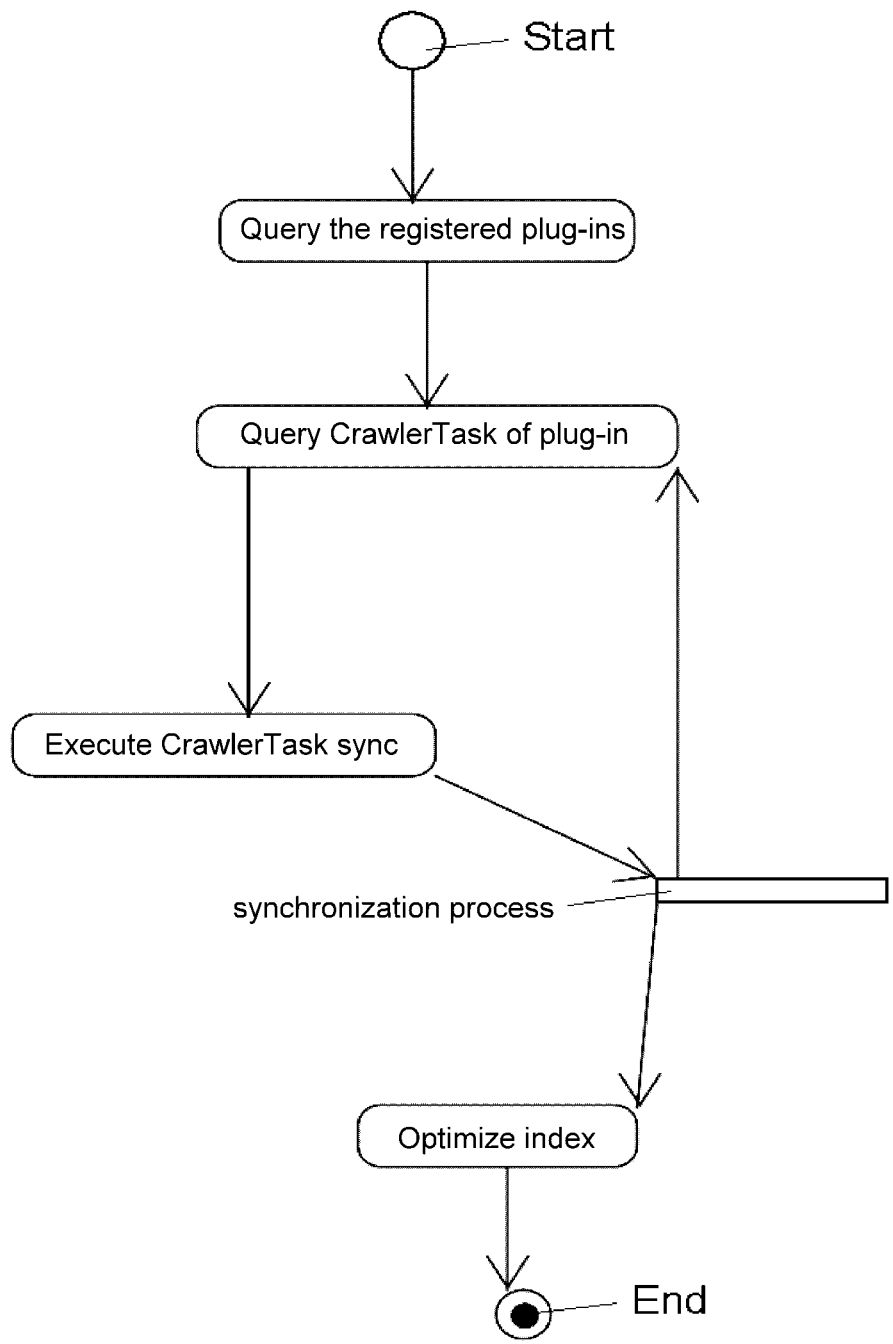
FIG. 15 shows a flow chart of another exemplary embodiment of an interrelation acquisition according to the invention.

FIG. 15 shows and describes in an exemplary manner how the corresponding plug-in is queried for a crawler task for identification of new contents. From a technical point of view, this subsystem realising synchronisation processes is a so-called class which queries the respective data sources of the plug-in for new, deleted or generated interrelations.

Figure 16:
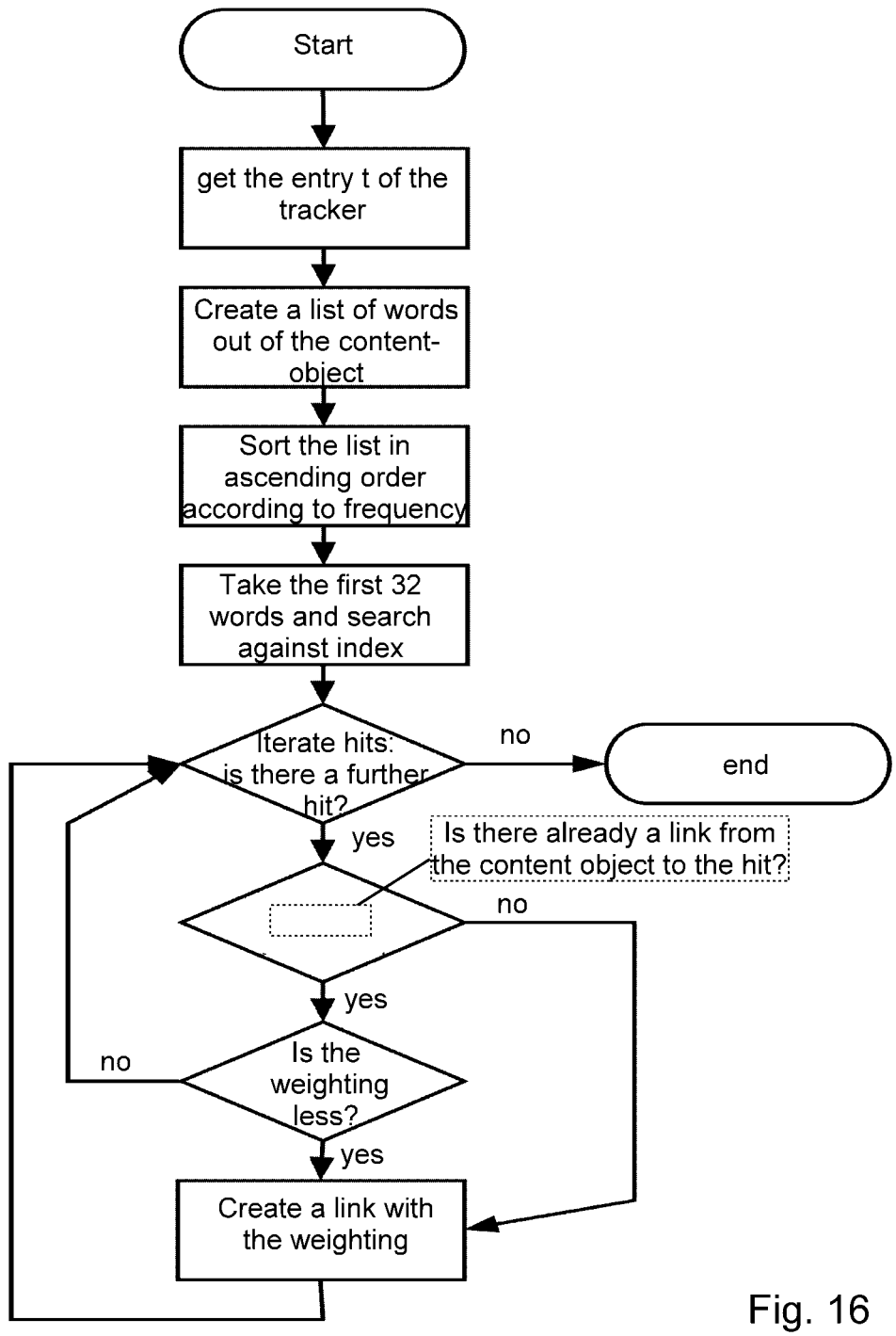
FIG. 16 shows a flow chart of another exemplary embodiment of an interrelation acquisition according to the invention.

FIG. 16 shows and describes in an exemplary manner how an analysis of full texts according to the invention within the scope of an acquisition of interrelation according to the invention takes place, wherein at least one word from a list (list of words) of words contained in the full text that has been made from a full text is used as the at least one item of data representing at least one item of information of the request for an interrelation (interrelation request). The list of words made from a full text in the pattern analysis will be arranged in an ascending manner in accordance with the frequency of the words. The first 32 words of the list resulting from this will be sent as search query—i.e. a request for an interrelation (interrelation request)—to a full text of a search engine. As a result a list of the similar documents with a weighting determined by the search engine will be delivered. Subsequently, it will be respectively verified in the further analysis whether there is already a connection of the full text with the search hit. If this is the case, the higher weighting will be taken over. If this is not the case, a connection will be established and the weighting of the search result will be taken over.

The data processing system according to the invention further provides a cross-device man-machine interface for display, editing and control of complex contents or data inventories and their interrelations, in particular in order to satisfy the requirements with regard to a transparent control for modification of large data inventories and their interrelations and to make such a control comprehensible in particular for the untrained user and to facilitate it in comparison to other systems. The logic and ergonomics used by the man-machine interface are advantageously independent of the data processing devices or terminals used for or together with the data processing system according to the invention, for instance their output units such as monitors or displays.

The man-machine interface of the data processing system according to the invention advantageously enables an action-oriented control of the data processing system. The action-oriented control of the data processing system according to the invention replaces the functional menu control of computer-based programs usually used today. A functional menu control offers a selection of functions which are grouped in accordance with abstract criteria and are accessible in menu trees. Such abstract criteria are for instance "File" and "Edit" for the Windows operating systems of the company Microsoft. In comparison, the action-oriented control according to the invention—also referred to as action-oriented navigation—operates with context-sensitive options for action which have a binary structure in any application situation of the system. The binary structure relates to an input on the one side and an output of contents on the other side, or to authoring or modifying and displaying data inventories. The binary options for action are advantageously adjusted dependent on the respective action context, i. e. new options for action can be added in dependence on the respective action context, and/or other options for action can be omitted. The binary action-oriented control can advantageously be applied simultaneously to all output media, for instance with small displays of mobile terminals or with voice input and/or output, for which purpose the data processing device advantageously comprises a microphone and a speaker as input and output units.

The control or navigation through complex data inventories and their interrelations is advantageously realised by the man-machine interface of the data processing system according to the invention by a graphic user interface which serves to enter and/or reproduce interrelation requests, connections, interrelations, and/or interrelation weightings. Herein, the graphic user interface is configured for entering, modifying and/or reproducing data representing information in at least one data inventory.

The graphic user interface partitions the display area provided for reproduction by a display device into three areas, wherein in a first area, data representing information in at least one data inventory accessible via at least one data source, in a second area, at least one item of data representing at least one item of information of an interrelation request, and in a third area, at least one acquired interrelation between the item of data representing at least one item of information of the interrelation request and the item of data representing at least one item of information of the data inventory is reproduced.

The partitioning according to the invention of the display area into three sub-areas is subsequently referred to as triadic window technique. While the window techniques known from the graphic interfaces of modern operating systems either operate with list, icon, or tree diagrams for representing the hierarchical structure of data and files of a computer system, the triadic window technique according to the invention operates with a horizontal or vertical tripartition of the available display area (window).

Figure 17:
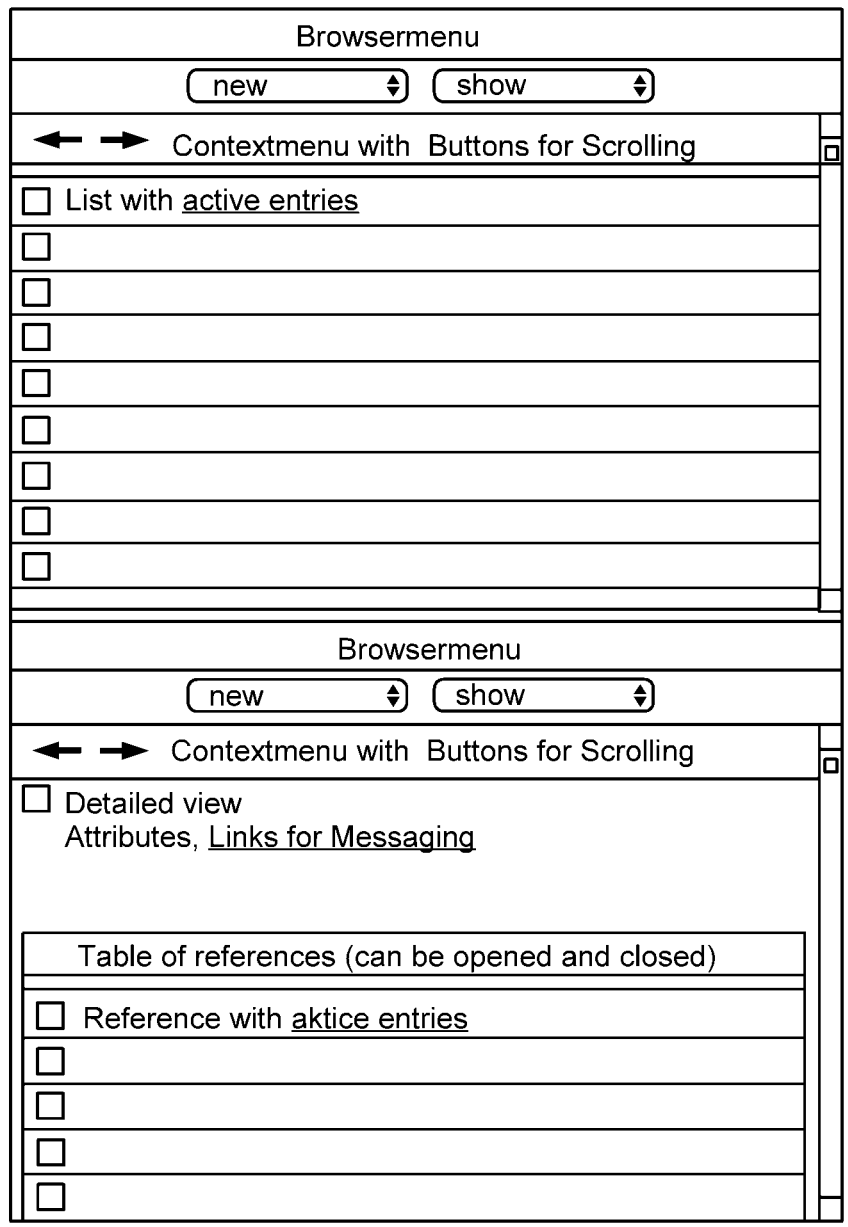
FIG. 17 shows a schematic diagram of a principal exemplary embodiment of a graphic user interface according to the invention for the use of a data processing system according to the invention.
Figure 18:
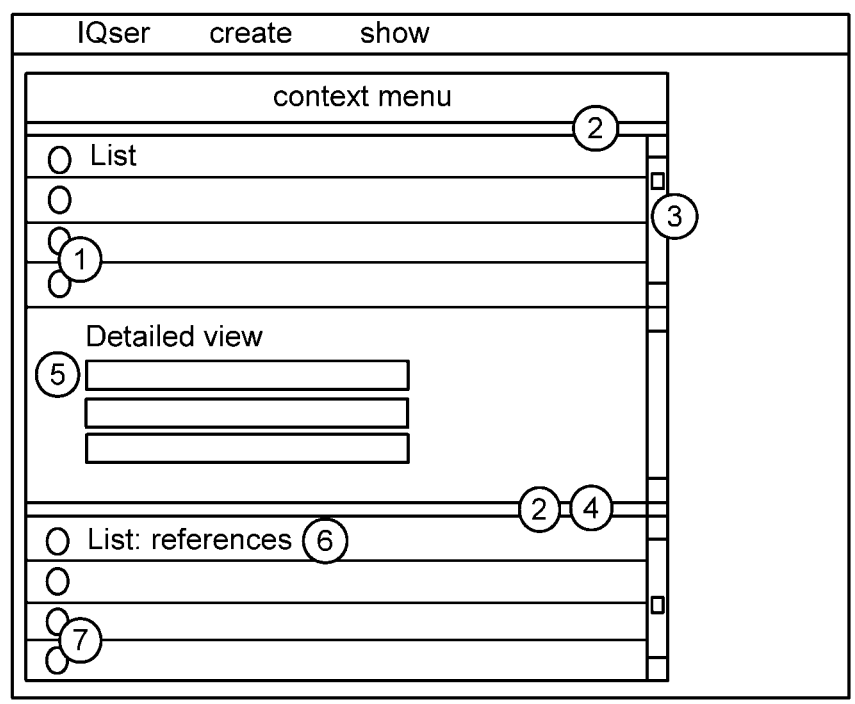
FIG. 18 shows a schematic diagram of another principal exemplary embodiment of a graphic user interface according to the invention for the use of a data processing system according to the invention.

A corresponding graphic user interface is shown in FIG. 17 and FIG. 18, in the present invention in the form of a principal example of a so-called Internet front-end, with a vertical partition of the display area. Herein, the data processing system according to the invention can be used in the form of a so-called web browser (FIG. 17) or a so-called JAVA client (FIG. 18).

With the vertical partition of the display area represented in FIG. 17 and FIG. 18, a selection of contents is shown as a list in tabular form for instance in the upper third of the display area (window), in the second third of the display area (window), there is a detailed view of an item of content selected from the first list, and in the last third of the display area (window), all contents linked with the selection are shown, which appear or are reproduced for instance also in a list. In this manner, the user can see at a glance which contents belong together and can continue navigation directly from there in order to search for contents or to derive knowledge from the interrelations. Epistemology shows that knowledge is generated by linking information. Thus, the data processing system according to the invention not only makes information transparent, but also knowledge. If the user selects an item of content from the list in the last third of the window, an animation will be advantageously started which shifts the last animation upwards, wherein the subsequently shown "triadic window" has the same structure and logic. Furthermore, the user can also navigate back, so that the animation is correspondingly reversed.

In another vertical partition of the display area not shown in the figures, for instance the result of a (selection) in the form of a list of contents can be seen in the upper third of the display area (window), the connections or interrelations to a selected content from the list of the first area are shown in the second third of the display area (window), and the last third of the display area (window) shows a preview of the selected content (item of data representing information). The preview reproduced in the third area of the display area may be better legible or visible if the proportion in size between the first two areas and the third area is variably adjustable, so-called "split plane". Control and navigation in this case are advantageously restricted to the first two areas of the display area, while the preview in the third area simply changes in the same place. The sequence of the window areas can vary depending on the implementation.

The advantage of the graphic user interface of the data processing system according to the invention is that the user can see at a glance which contents belong together and can directly continue controlling or navigating in order to search for contents or to directly derive knowledge from acquired interrelations. Herein, an endless control or navigation, respectively, is provided in accordance with the invention.

The fields marked with the reference numerals 1 to 7 in FIG. 18 have the following functionalities:
 1: List entries can be dragged to the list of references by drag and drop in order to create a connection. A double-click will open the detailed view in a new window;
 2: Column headers: A sorting criterion can be selected by mouse click;
 3: Scroll bar in order to be able to completely view lists and detailed lists which cannot be displayed completely in the window area;
 4: The area for the list can be moved, and even completely "folded up" with pressed mouse button;
 5: The detailed list entry comprises scroll bars in order to be able to completely view lists and detailed lists which cannot be displayed completely in the window area;
 6: Column positions provided with background functions, for instance an email address leads to a mask for writing an email and
 7: References can easily be deleted by dragging them out of the window area by the mouse.

In the following, processes occurring within the scope of use of the data processing system and their realisation on the part of the respective user interface are described by way of example.

"Display a List"

In the application of the user interface (GUI), the user selects a menu item from the menu or navigation for displaying contents, for instance in order to view all of the latest projects. The list of menu items to be selected is similar to a bookmark list of a browser. In the data processing system according to the invention, however, the bookmarks do not refer to static pages or lists, but to dynamic interrelations. Correspondingly, this part of navigation will look different from user to user. In the present invention, the data processing system is realised as a JAVA client.

"Add Attributes"

In order to add a new attribute to a content object, the user calls up the edit mode of a content object. In addition to the existing attributes, the user will find an empty field where he can enter a new attribute or select from an accompanying list. An address is an object for which the IQser suggests attributes:

Since in the Java client, edit and view mode are not differentiated, it is advantageously proposed for this variant to supplement the navigation "new" with the option "Add attribute". If external data sources are used, the additional attributes will be memorized in the IQser.

If the user selects the option "module" (or a different designation) in the menu, a new empty module is shown in the detailed view. The designation is also empty. Advantageously, an additional selection box with the previously defined modules is provided. Subsequently, the data processing system advantageously verifies whether this designation already exists for a module, and corrects any typos or redundancies, if required.

Figure 19:
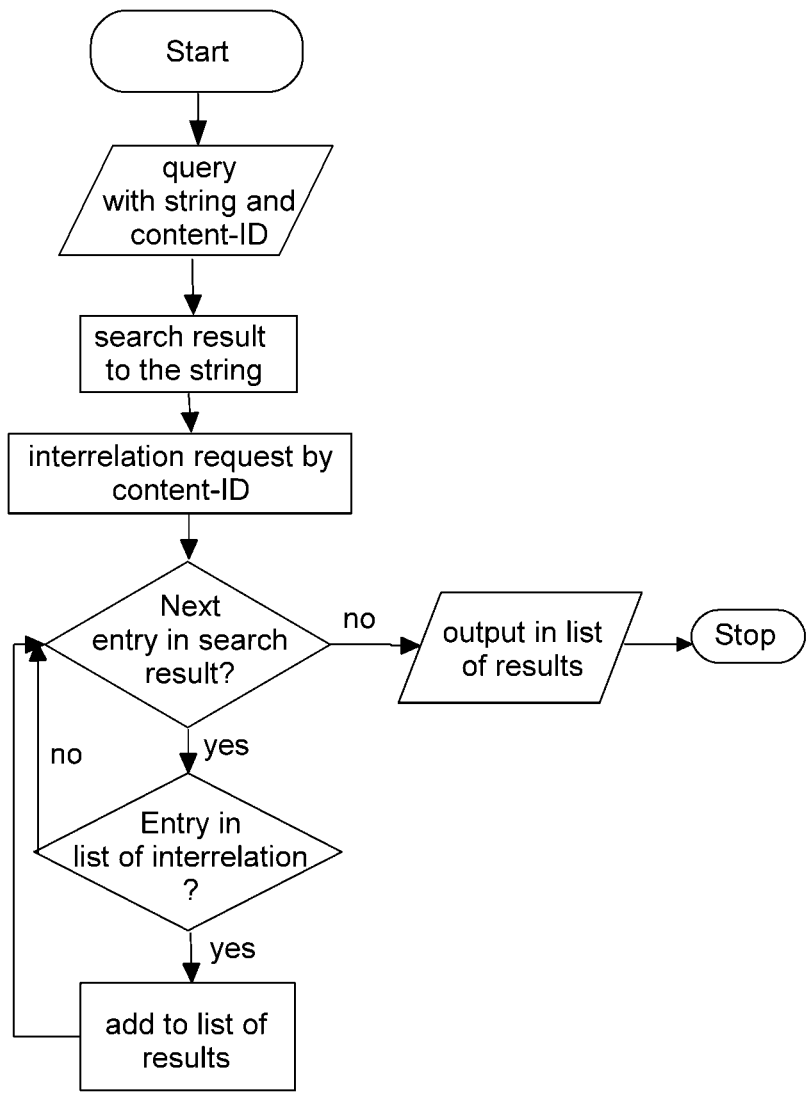
FIG. 19 shows a flow chart of an exemplary embodiment of a context search according to the invention within the scope of an acquisition of interrelations according to the invention.

FIG. 19 shows and exemplarily describes the development of a context search according to the invention within the scope of an acquisition of interrelations according to the invention. In the present case, in a context search according to the invention, only such items of content are searched in a semantic network, which are placed in the context of a certain content. In this manner, the search can be substantially refined in dependence on the context. The context search is handed over to the data processing device, preferably a server, together with a search string as well as a content ID. As the flow chart according to FIG. 19 shows, at first a search request is realised on the base of the search string. Then, such links to the content object are called, in the context of which the search result shall be placed. Then, this list will be iterated and it is checked whether a list entry is present in the search result. If this is the case, this list entry will be received in the list of results. Herein, according to the invention, the interrelation request is advantageously realised as a request addressed to a search engine. Thus, within the scope of an interrelation request, at first an interrelation request to the at least one pre-definable item of information (search string) as the at least one item of data representing the at least one item of information of an interrelation request is realised, then an interrelation request to the at least one result of the interrelation request to the search string as the at least one item of data representing at least one item of information of an interrelation request to the content ID is realised. Finally, the result of the interrelation request to the result of the interrelation request to the search string will be acquired and reproduced.

Figure 20:
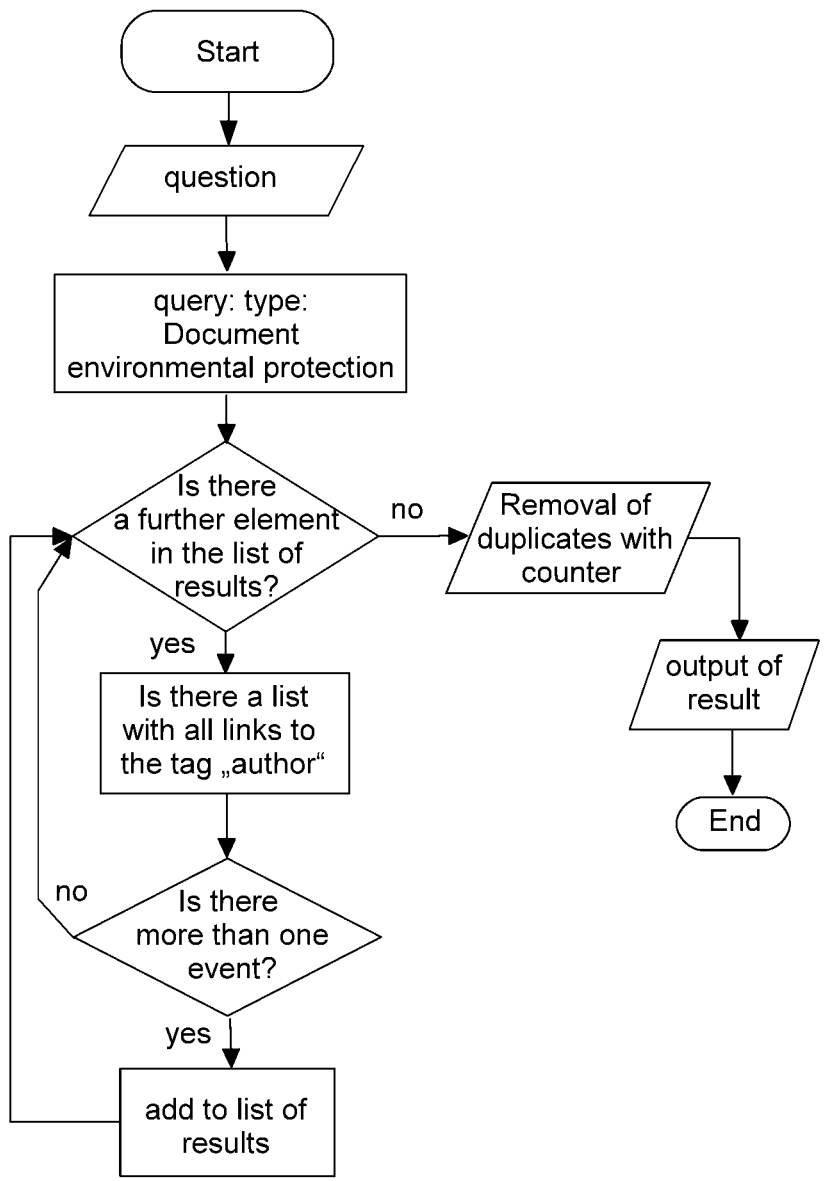
FIG. 20 shows a flow chart of an exemplary embodiment of an ontological acquisition of interrelations according to the invention within the scope of an acquisition of interrelations according to the invention.

FIG. 20 shows an exemplary embodiment of an ontological acquisition of interrelations according to the invention within the scope of an acquisition of interrelations according to the invention. Herein, implicit ontology means that automatically a set of statements in the sense of a subject-predicate-object-relation (SPO relation) is generated which also plays a role in the semantic web, in particular OWL and RDF. Thereby, queries in natural language are enabled which can be solved by means of AIML.

Already during the analysis process according to the invention, the SPO relation is determined and memorized. Always when a link is created, the method
createLink(c1, c2, p, w)
is called, wherein p represents the predicate which connects the subject c1 to the object c2. W represents the weighting of the link. In the pattern analysis, p is designated as "alike" (similar). In the syntax analysis p gets the designation of the key attribute that has created the link. In manual links, p can be determined freely.

For the management of the statements (SPO relations) two advantageous possibilities exist:

There are several predicates (so to speak tags) for each relation. Herein, it is checked for a link that is already existent, whether the predicate is already present. If this is not the case, it will be added to the existing tags.

There are several relations of the same pair c1 and c2 with respectively one predicate. Herein, it is respectively checked, whether a relation with the new tag is already existent. If this is not the case, a new relation will be created which is written with the current tag.

The first variant advantageously provides for more clarity in the display of the links.

Thus the following queries are for instance possible according to the invention:

Who is the author of a document which treats the subject "environmental protection"?

Who is the friend of Max Mustermann (if this tag has been set).

Who is the project leader of a project concerning solar cells?

Which accessories are available for the apparatus XY?

For carrying out these queries, advantageously combinations of filter- and/or link queries are used.

It is especially advantageous that according to the invention the possibility has been provided and created to be able to see for each link how this link has been established. This is for instance shown by a column in a table of results.

The flow chart in FIG. 20 shows how the interrelation request "Who is the author of documents which deal with environmental protection?" is ontologically carried out according to the invention.

A similar interrelation request could be: "Who was or is collaborator in a project concerning solar cells?" The question can be reduced to two variables:

tag for the interrelation filter for the search request.

In this manner, a new method has been provided which enables complex requests.

Another advantageous use of an ontological interrelation request is provided by a method according to the invention for an automatic thematic allocation of texts.

Companies often dispose of a plurality of texts. For the access to and the processing of information it is helpful if texts are automatically allocated to a domain or the corresponding sources are allocated to a domain. For interrelation requests according to the present invention the following possibilities exist:

1. A database comprising domains is connected via a plug-in. For each domain an expert can collect the morphemes and words that are characteristic for the domain. Within the scope of interrelation requests the automatic analyses of the solution according to the invention assumes the function of allocating texts and relating domains which complement or include each other. As a result, the user can navigate over domains and find corresponding sources.

2. The company makes a collection of texts available which will be examined with respect to characteristic words and morphemes by means of a special tool. For this, a list of words is generated on the base of the texts, wherein the statistic frequency is allocated to each word. This list of words will then be filtered through a list of articles and basic verbs (stop words) and arranged in a descending order according to word frequency. The 32 most frequent words will be used for the description of the domain.
3. In accordance with the pattern analysis of full texts, the list of words described under item 2 can collect the 32 less frequent words. Thereby a poorly defined delimitation of stop words can be avoided or saved.
4. In an analysis process a text is converted into a list of words. Afterwards, each word will be looked up in the database of the project German Vocabulary (Deutscher Wortschatz) (http://www.wortschatz.uni-leipzig.de) from which the domain will be retrieved. Thus, a list of domains is created on the base of the list of words according to the invention. This list will be in turn condensed, in that each domain only appears once with the allocated frequency. Then, the list will be arranged in a descending manner. The three most frequent domains are allocated as tag to the content (content object).
5. An especially preferred and precise method of the invention is the difference analysis. Herein, advantageously two text collections are compared with each other. Preferably a text collection comprising general subjects, for instance the base of the project German Vocabulary, and a text collection comprising text of a certain domain will be compared. A list of words, preferably without doublets, will be generated from both text collections. Herein, the words will be arranged in a descending order with respect to their frequency together with this value. In the second step, the relative frequency is calculated for each word of the two lists of words on the base of the quotient of the absolute frequency and the total number of the word forms of the respective list. In the third step, the two lists of words are compared. For the list of words from the text body of the professional texts a quotient is formed for each word on the base of the relative frequency of the same list with the relative frequency of the other list. Afterwards, the thus complemented list of words will be arranged according to this value. In the present invention, the 32 most frequent words are selected as describing for a special domain. These 32 words can be used for the description of a domain within the scope of a solution according to the invention (IQser), in order to automatically allocate texts by means of the pattern analysis.

The solution according to the invention advantageously enables to answer concrete questions, the answers of which are based upon a set of statements. A simple question or request is for example: "Who is the author of a document which deals with the subject environmental protection?". A precondition is that the queried system (data processing system) contains statements of such kind that for example the person x has composed the document y and that the document y deals with the subject environmental protection. More complex requests consist of questions comprising relative clauses which additionally delimit or enhance a subject or an object. More complex questions are for instance: "Which person is the author of a document which deals with the subject environmental protection and is at the same time collaborator of a research institute?" or "Which documents dealing with the subject environmental protection have been written by persons who are collaborators of a research institute?".

The statements which the system accesses for answering the questions are advantageously created by the implicit ontology realised according to the invention. Herein, the implicit ontology is based upon the semantic network which has been created on the base of different analyzing methods. Herein, data representing information of the available data inventories—in the following also referred to as information objects or concepts—are linked to each other according to the invention. In a syntactic link according to the invention enabling a syntactic analysis, the link will be advantageously described as edge of a graph by the designation of a key attribute or another reason of the link. Herein, statements in the form of subject-predicate-object are advantageously created, wherein subject and object are information objects from the data inventory and the predicate is the above mentioned reason of a link.

Furthermore, statements which the system accesses for answering the questions can also be formulated explicitly, preferably in the semantic languages RDF and/or OWL.

In an advantageous embodiment of the invention, all data representing information of the available data inventories (information objects or concepts), preferably any structured and/or non structured data of data inventories that are accessible via data sources, are indexed and the indices of the data representing information are memorized as reference in a database. In another advantageous embodiment of the invention the multi-relational links of the semantic network are also memorized in a database.

Figure 21:
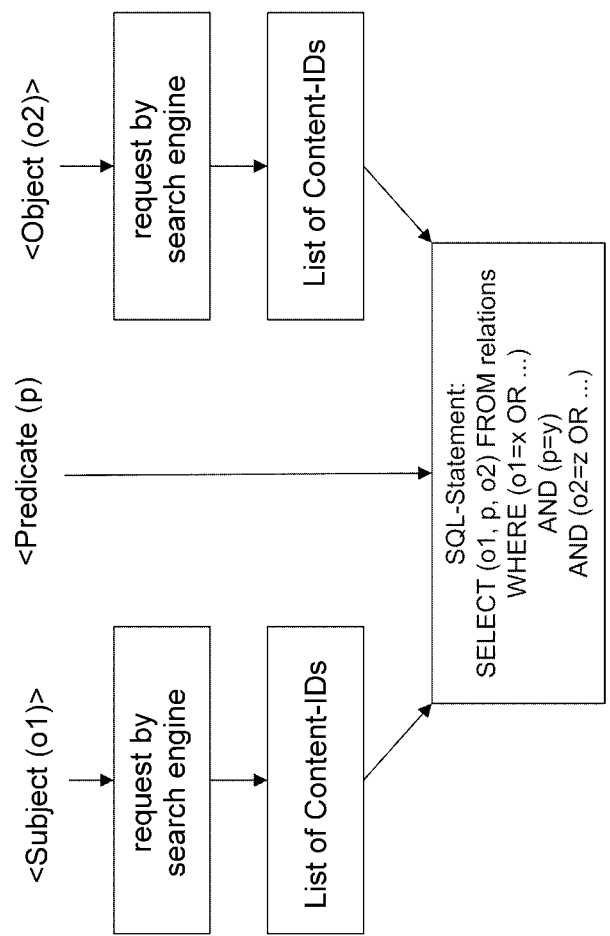
FIG. 21 shows a block diagram of an exemplary embodiment on principle of a processing of a query of statements based upon sets of statements in the sense of subject-predicate-object relations generated according to the invention.
Figure 22:
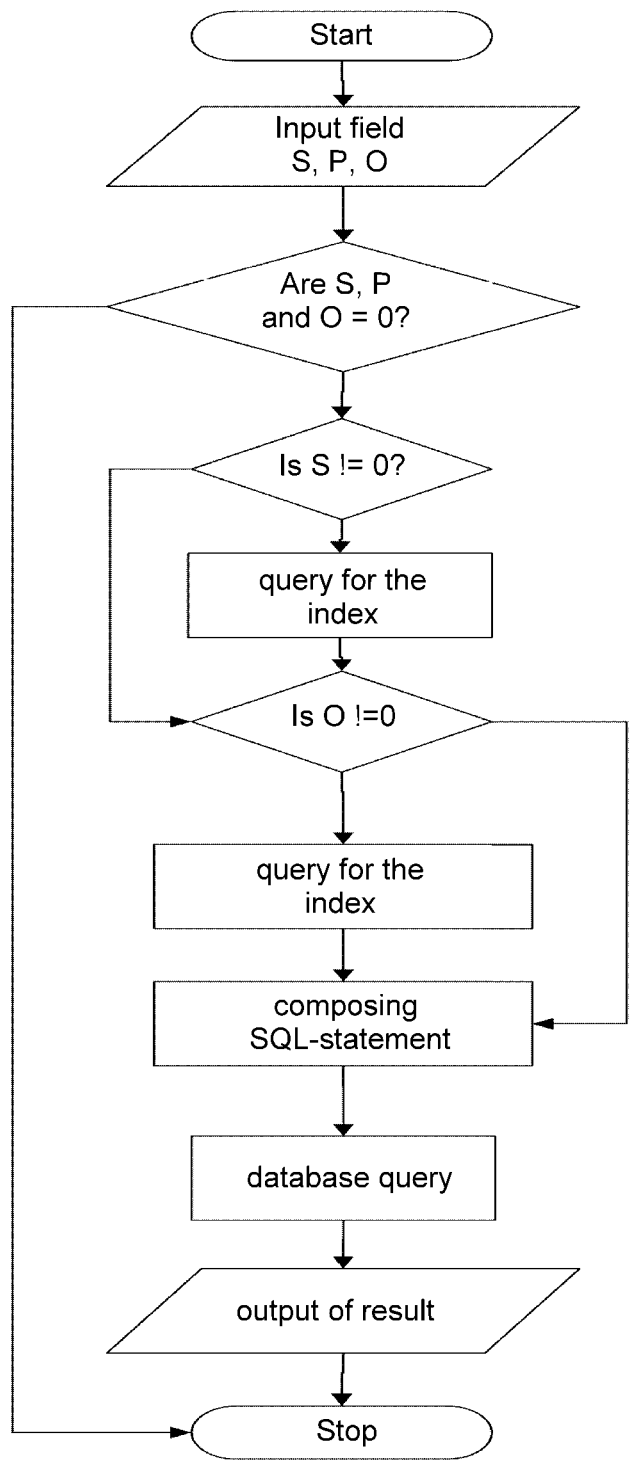
FIG. 22 shows a flow chart of an exemplary embodiment of a query according to the invention according to FIG. 21.

Simple queries such as for instance "Who is the author of a document which deals with the subject environmental protection?" fetch statements in the form of subject-predicate-object according to the invention. Thus, the corresponding request or search object consists of the three mentioned parts subject, predicate and object. According to the invention, subject and object are described or selected with an interrelation request (search request). This can be mentioning the object type (for example person), a special attribute (for example surname) or a search term (for example chemist). According to the invention, the predicate will be described or selected with a key attribute (for example author) or a reason for the link (for example text similarity). This request or search object advantageously leads to two queries (search requests) for the subject and the object. The results of the queries are advantageously used for compiling a SQL query which queries the relations. It is advantageously possible that one or more parts of the request object are not defined such that for instance the predicate, the subject or the object can be arbitrary. According to the invention, the following questions can be answered in this manner: "Which documents dealing with the subject environmental protection have been written by the author x?", "How are person x and person y related to each other?", "Perhaps by friendship or by a common acquaintance.", "Which scientific disciplines exist in the field of philosophy?", "Which solution exists for a problem with the DVD player of the laptop XYZ?". Each of these requests can be reduced to the following structure: S( . . . ) P( . . . ) O( . . . ) with S=search request for the subject, P=description of the predicate and O=search request for the object. FIG. 21 shows the processing of a corresponding request, FIG. 22 shows the corresponding flow chart. The SQL statement "SELECT (o1, p, o2) FROM relations WHERE (o1=x OR . . . ) AND (p=y) AND (o2=z OR . . . )" is only an exemplary embodiment on principle of a SQL statement. SQL statements that are used can also differ from this.

As already explained, complex requests consist of questions with relative clauses which additionally delimit or enhance a subject or an object, such as for instance:
1. "Which person is the author of documents dealing with the subject of environmental protection and is at the same time employee of the company x?";
2. "Which documents with respect to the subject environmental protection have been written by persons who are employees of the company x?"

The questions can be advantageously brought into the following, wherein respectively the first subject is the wanted set of objects:

1. S( . . . ) [P( . . . ) O( . . . ) and P( . . . ) O( . . . )]
2. S( . . . ) P( . . . ) [S( . . . ) P( . . . ) O( . . . )]

Figure 23:
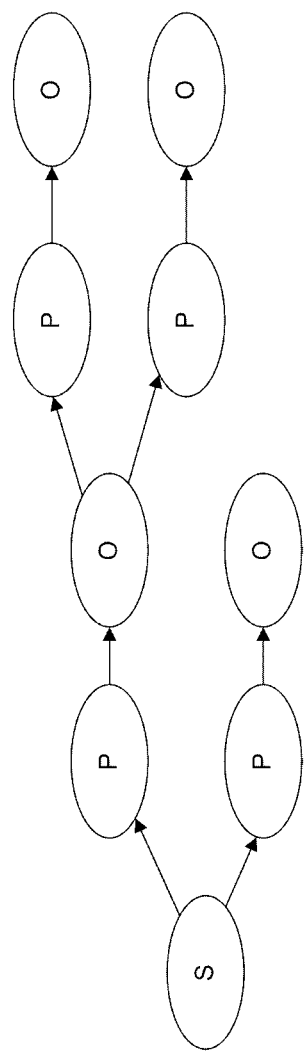
FIG. 23 shows a schematic diagram of an exemplary embodiment on principle of a graph of a query according to the invention of statements based upon sets of statements in the sense of subject-predicate-object relations generated according to the invention; wherein the graph represents the division of a complex query.

According to the invention, each request can thus be represented by means of a graph in which the subject is connected to several predicates and the predicate is only connected to one object, wherein the object can again become the subject of a partial question. The edges of the graph between subject and predicate can be advantageously an AND function or a logic addition. FIG. 23 shows an exemplary embodiment of a graph for such a complex request.

Figure 24:
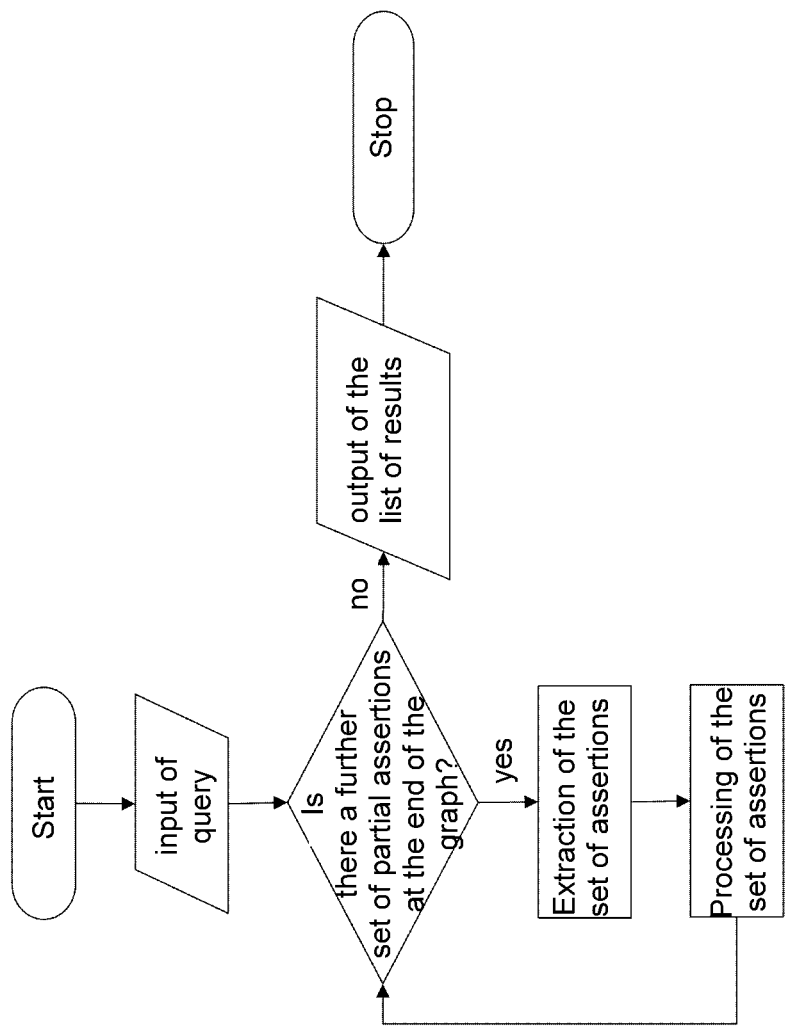
FIG. 24 shows a flow chart of another exemplary embodiment of a query of statements based upon sets of statements in the sense of subject-predicate-object relations generated according to the invention and FIG. 25 shows a flow chart of another exemplary embodiment of a query of statements based upon sets of statements in the sense of subject-predicate-object relations generated according to the invention.
Figure 25:
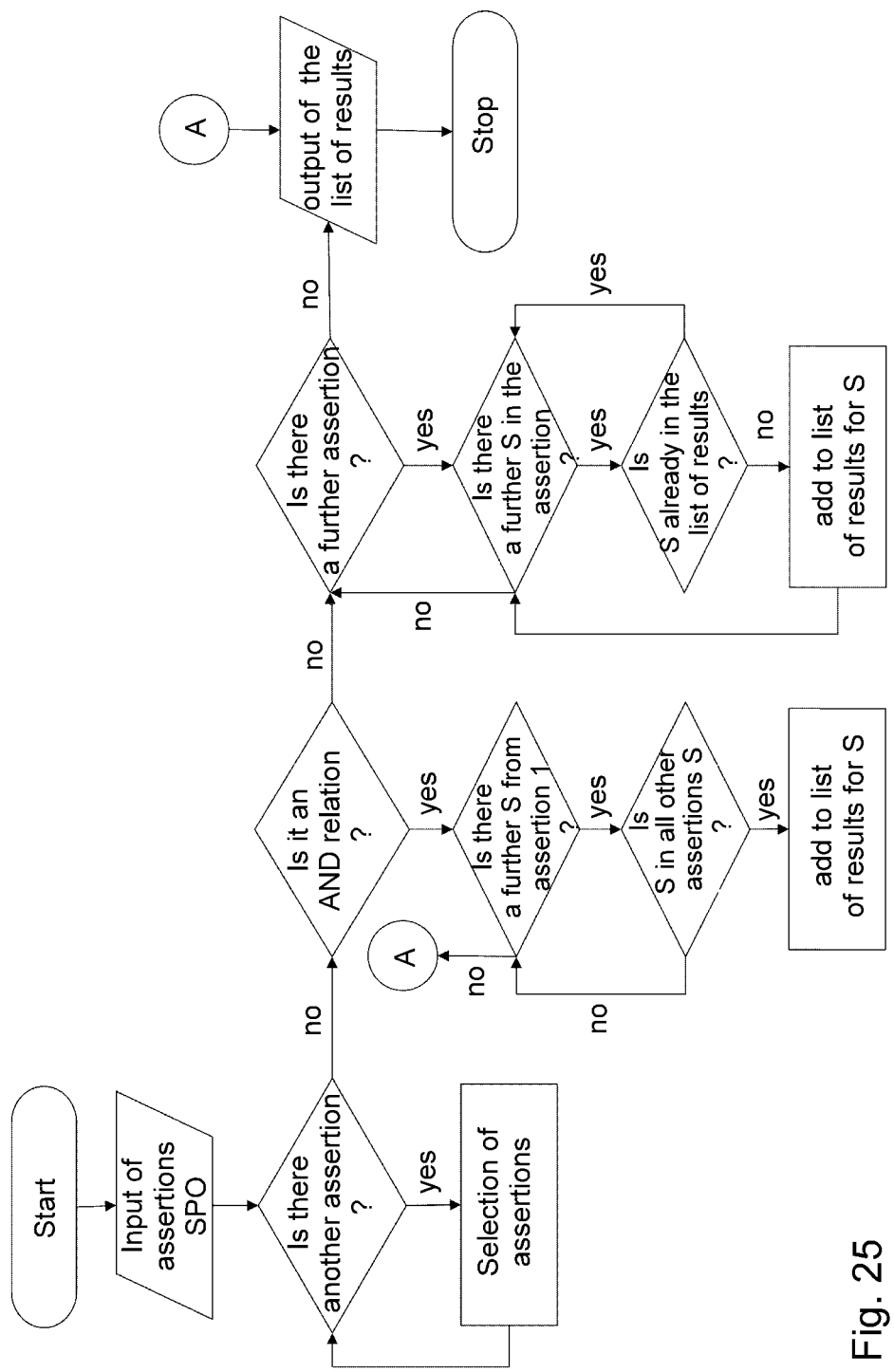

According to an advantageous proposal of the invention, the solution for answering the complex requests is realised by dividing the request into partial requests. Herein, the questions are advantageously worked on starting from the most inner parenthesis towards the most outer statement. For the question in the form S( . . . ) P( . . . ) [S( . . . ) P( . . . ) O( . . . )] for instance, at first the statement in the bracket would be answered and a result for the subject delivered. Then, the outer statement can be queried. Herein, according to the invention, the statements are advantageously divided at first, then the individual or partial statements are selected and afterwards the results are linked, as represented by the flow chart in FIG. 24. Herein, the linking of the individual or partial statements is advantageously realised by a differentiation between an AND function or logic addition. In the first case (AND function), a cut-set of the results is formed, in the second case (logic addition) a join of sets. FIG. 25 shows the associated flow chart.

An especially advantageous embodiment of the invention enables requests which include conclusions, for instance:

1. "Which person is professionally qualified in the field of ethics?";
2. "Which hotel room in the city x has an internet connection?"

If, for instance, a qualification "ethics" is not directly allocated to a person, the solution according to the invention enables to formulate a question which will however deliver a result via several links. The person may, for instance, be linked to a description of the qualifications, for example contained in a curriculum vitae or a like document. The document curriculum vitae may, for instance, be linked to a description of the studies which were mentioned in the curriculum vitae, wherein the description contains a hint to ethics. The hint to ethics can also be in turn hidden in a link. A corresponding request had to be created as follows: "Which person has a curriculum vitae which refers to studies dealing with ethics?"

Also the second example of the hotel room can select a hotel room even if the description of a hotel room does not contain the quality "has an internet connection", but is only allocated to a category which in turn refers to the feature that the hotel room has got an internet connection.

The exemplary embodiments of the invention shown in the figures of the drawing and explained in connection with the description merely serve to explain the invention and are in no way restrictive.

What is claimed is:

1. A system for querying interrelations of data objects, wherein the query contains parameter for the interrelations of data objects, comprising:
    a data source;
    a data inventory in communication with the data source, wherein the data inventory comprises a plurality of objects, said plurality of objects including at least one data object, and at least one interrelation object including link statements that provide a link between interrelated data objects,
    wherein each link statement includes a reference to:
        first and second data objects of the data inventory;
        a weight value; and
        one or more reasons for said link, each reason defining a predicated relationship between the first and second data objects;
    a processor in communication with said data source and said data inventory;
    software executing on said processor for establishing interrelation objects in said data inventory, said software utilizing interrelation requests,
    wherein each interrelation object is established based on at least one of syntactic comparison, semantic comparison, and pattern analysis to generate link statements representing interrelations between data objects of the data inventory,
    wherein said syntactic comparison includes:
        executing a search query with keys associated with a given data object,
        compiling at least one interrelation object that includes one or more link statements representing weighted and predicated interrelations for each search result of the search query, and
        storing the at least one compiled interrelation object in said data inventory;
    wherein said semantic comparison includes:
        retrieving a previously user selected object in said data inventory represented by a data object from a tracker of user actions,
        compiling or modifying at least one interrelation object that includes one or more link statements representing a weighted and predicated interrelation between the previously user selected object and a given data object, and
        storing the at least one compiled or modified interrelation object in said data inventory;
    wherein said pattern analysis includes:
        extracting a list of words associated with a given data object,
        sorting the list of words in ascending order according to their frequency,
        executing a search query with a defined number of top words,
        compiling at least one interrelation object that includes one or more link statements representing weighted and predicated interrelations for each search result of the search query, and
        storing the at least one compiled interrelation object in said data inventory;
    a threefold query for data objects in the data inventory, wherein the threefold query comprises:
        a first query parameter that contains constraints for objects in the data inventory representing a data object,
        a second query parameter that contains constraints for objects in the data inventory representing interrelation objects based on one or more link statements defined therein, and
        a third query parameter that contains constraints for objects in the data inventory representing a data object;
    software executing on said processor for querying interrelations of data objects using said threefold query for objects in the data inventory by:

retrieving a first set of data objects for the first query parameter, retrieving a second set of data objects for the third query parameter, and comparing each data object of the first set of data objects, each data object of the second set of data objects and the constraints of the second query parameter with at least one interrelation object in the data inventory to form a result list of interrelated objects in the data inventory; and a user interface connected to said processor for presenting the result list of interrelated objects to a user.

2. The system of claim 1, wherein said first query parameter and said third query parameter are only compared with objects of said data inventory that are interrelated according to the second query parameter of said threefold query for compiling the result list of interrelated data objects.

3. The system of claim 1, wherein the threefold query comprises three search strings.

4. The system of claim 1, wherein the threefold query comprises a tree of threefold query statements each including a subject query, a predicate query and an object query, and in which each leaf of said tree specifies either a queried object of a superior query statement or a queried subject of queried superior query statements.

5. The system of claim 4, wherein the tree of threefold query statement is compiled by decomposing said tree into segments of threefold query statements as terms of a nested boolean operation, retrieving predicated interrelations for each term based on interrelation objects of said data store and filtering the results in case of boolean AND or expanding the result in case of a boolean OR.

6. The system of claim 1, wherein the user interface is a graphical user interface.

* * * * *